United States Patent
Kamada

(10) Patent No.: US 6,173,573 B1
(45) Date of Patent: Jan. 16, 2001

(54) CONTROL DEVICE FOR HYDRAULIC DRIVE MACHINE

(75) Inventor: Seiji Kamada, Hiratsuka (JP)

(73) Assignee: Komatsu Ltd., Tokyo (JP)

( * ) Notice: Under 35 U.S.C. 154(b), the term of this patent shall be extended for 0 days.

(21) Appl. No.: 09/125,691

(22) PCT Filed: Feb. 28, 1998

(86) PCT No.: PCT/JP97/00597

§ 371 Date: Aug. 24, 1998

§ 102(e) Date: Aug. 24, 1998

(87) PCT Pub. No.: WO97/32135

PCT Pub. Date: Sep. 4, 1997

(30) Foreign Application Priority Data

Feb. 28, 1996 (JP) .................................. 8-041554
Feb. 29, 1996 (JP) .................................. 8-043101

(51) Int. Cl.$^7$ ............................................ F15B 11/042
(52) U.S. Cl. .................................. 60/422; 60/426; 91/517
(58) Field of Search ........................ 60/327, 422, 426; 91/517

(56) References Cited

U.S. PATENT DOCUMENTS

| | | | |
|---|---|---|---|
| 4,537,029 | 8/1985 | Gunda et al. ........................... | 60/422 |
| 4,823,551 | 4/1989 | Hehl ....................................... | 60/422 |
| 5,138,838 | 8/1992 | Crosser ................................. | 60/426 |
| 5,666,806 | 9/1997 | Dietz ..................................... | 60/327 |

Primary Examiner—F. Daniel Lopez
(74) Attorney, Agent, or Firm—Diller, Ramik & Wight, PC

(57) ABSTRACT

A first object of the present invention is to make do with a simple hydraulic circuit, which does not utilize a pressure compensation valve, and to enable the use of an inexpensive, low-precision pressure detector, to enable the maintenance of continuous control at all times using simple controls, and to get by without shocking the operator or the mechanical parts, and to cancel the load dependency of a hydraulic actuator flow during combined operation without limiting the control system of the hydraulic pump. In a device according to the present invention, a correction factor for correcting an control input of a operating member corresponding to a pertinent operating valve is calculated for each operating member on the basis of a ratio between a detected differential pressure across an operating valve, and a minimum differential pressure selected from among detected differential pressures across a plurality of operating valves. Then, a control input of a corresponding operating member is corrected using this calculated correction factor. Further, a second object of the present invention is to enhance work efficiency by enabling changing of pressure compensation characteristics of an hydraulic actuator in accordance with a operating lever operating state and load pressure. In a device according to the present invention, an upper limit value or lower limit value of a correction factor is set for each operating member in accordance with control input of the operating member, and this correction factor is used to correct the control input of a corresponding operating member so that a correction factor obtained in accordance with a detected differential pressure does not exceed the above-mentioned set upper limit value or lower limit value.

6 Claims, 15 Drawing Sheets

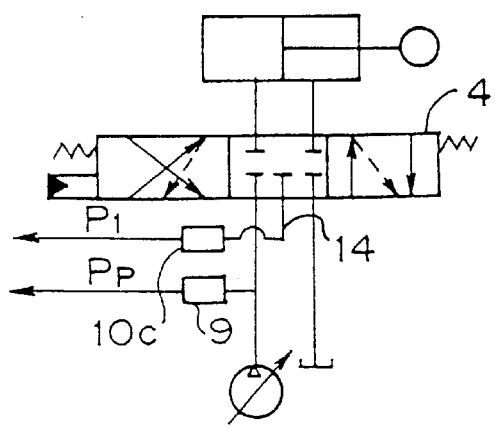
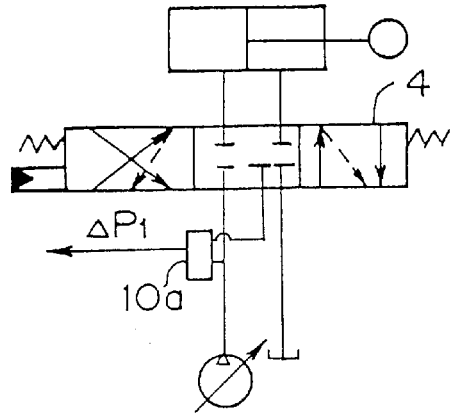
FIG. 3(a)        FIG. 3(b)
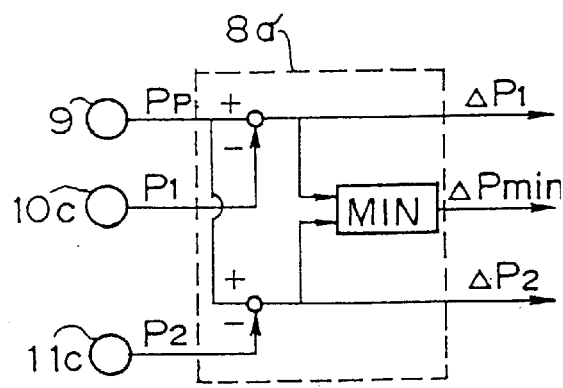
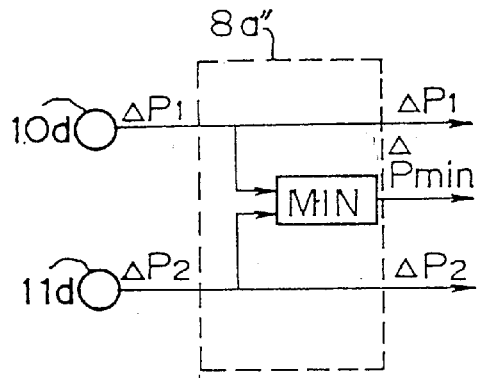
FIG. 4(a)        FIG. 4(b)

CONTROL DEVICE FOR HYDRAULIC DRIVE MACHINE

TECHNICAL FIELD

The present invention relates to a control device, which drives and controls a hydraulic actuator in accordance with the control input of a operating member in a hydraulic drive machine, such as an hydraulic excavator, or crane.

BACKGROUND ART

In general, hydraulic drive machines, such as construction equipment, are configured so that a drive command signal, which specifies a control input for a plurality of operating levers, is applied to a plurality of corresponding operating valves (flow control valves). The above drive command signal changes the areas of the apertures of these plurality of operating valves, thereby driving a corresponding plurality of hydraulic actuators. In other words, when a plurality of operating levers are operated simultaneously, pressure oil discharged by a hydraulic pump is supplied to a plurality of hydraulic actuators via a plurality of operating valves on a plurality of pressure oil supply channels, and these plurality of hydraulic actuators are driven simultaneously.

With this configuration, there is something called a load sensing system, which serves as the technology that cancels the so-called load dependency of the drive velocity of hydraulic actuators operated in combination.

With this system, a valve, called a pressure compensation valve, is provided either between a hydraulic pump and a flow control valve, or between a flow control valve and a hydraulic actuator, and works to compensate for the differential pressure of pressure across a valve for pressure oil, which flows through a flow control valve, so that this differential pressure is the same value for all drive shafts (In construction equipment, a drive shaft refers to a boom, arm, et cetera.). That is, in the general formula for a hydraulic circuit, $$Q = c \cdot A \cdot \sqrt{(\Delta P)}$$

(provided that Q is the flow that passes through a restrictor of a flow control valve, c is the capacity constant, A is the area of a restrictor aperture, and $\Delta P$ is the differential pressure across a restrictor), the load sensing system works to achieve a flow Q, which is proportional to an operator-ordered drive command value (aperture area A) by making the differential pressure $\Delta P$ the same for each drive shaft.

Further, the load sensing system works to control the discharge pressure of the hydraulic pump so that the discharge pressure of the hydraulic pump achieves a pressure whereby the above across-valve differential pressure is added to the maximum value of the load of the operating hydraulic actuators. This prevents changes in velocity (load dependency) resulting from differences in the load of each hydraulic actuator when operated in combination.

However, there are drawbacks to this system, such as complex valve configurations, and susceptibility to hunting as a result of poor hydraulic stability.

Accordingly, to solve for this problem, Japanese Patent Publication No. 6-41762 and Japanese Patent Publication No. 6-41764 propose the configuration of a system that does not utilize the above-mentioned pressure compensation valve.

That is, the points disclosed in the above-mentioned announcements make use of the above-mentioned general formula for a hydraulic circuit, $$Q = c \cdot A \cdot \sqrt{(\Delta P)}$$

and strive to find, by reverse calculations from the relational expression $$A = Q/(c \cdot \sqrt{(\Delta P)}),$$

the aperture area A for achieving the target flow Q when there is a differential pressure $\Delta P$.

For arbitrary differential pressures $\Delta P$, which differ like this for each hydraulic actuator, the dependency of actuator velocity during combined operation is canceled by reverse calculating from the above general formula the aperture area required to achieve the various target flows.

Further, another method for canceling the above dependency without using a pressure compensation valve is disclosed in Japanese Patent Application Laid-Open No. 4-351304.

As disclosed in this announcement, the square root of the ratio between a differential pressure set in advance and the detected value of the differential pressure across a flow control valve is used as the correction factor to compensate for the drive command value (control input from an operating lever) for pertinent flow control valves of drive shafts other than the drive shaft with a minimum differential pressure across the flow control valve. This compensates for the drive command value so that the valve opening (aperture area) becomes as small as a drive shaft with a large across-valve differential pressure (drive shaft with a small load).

As disclosed in the above-mentioned Japanese Patent Publication No. 6-41762 and Japanese Patent Publication No. 6-41764, when finding the aperture area A, it is necessary to divide by the across-valve differential pressure $\Delta P$.

However, as a result of hydraulic pump flow saturation, which proves troublesome during the combined operation of hydraulic actuators, the differential pressure $\Delta P$ between the hydraulic pump and a hydraulic actuator can often become a value in the vicinity of 0 (kg/cm$^2$). Under these circumstances, there are times when the above-mentioned division operation is not possible.

Further, because processing requires division by a number approaching zero, the detection error of the pressure detector for detecting a differential pressure that approaches this zero impacts greatly on the accuracy of the arithmetic process, and control. Thus, to ensure better-than-constant accuracy requires a high-precision pressure detector. This is a problem in that it increases costs.

Furthermore, because the system determines whether or not it is possible to distribute the flow targeted for each hydraulic actuator from the dischargeable output of the hydraulic pump, complex processing is also required to correct target flows to each hydraulic actuator when the above-mentioned hydraulic pump saturation occurs.

Conversely, as disclosed in Japanese Patent Application Laid-Open No. 4-351304, similar to the above, when an across-valve differential pressure $\Delta P$ is corrected, since this corrected differential pressure becomes the denominator, to avoid having zero (near zero) as the denominator, the system is designed to perform control so that this correction processing is not carried out for a drive shaft with a minimum across-valve differential pressure $\Delta P$.

However, as a result of this, there is the problem that when switchover to the drive shaft with the minimum across-valve differential pressure $\Delta P$ takes place, it is necessary to switch from correction-based control to ordinary control. In that instant when switchover occurs, the continuity of drive command values to hydraulic actuators is interrupted, generating a shock each time switchover occurs.

Furthermore, as disclosed in this announcement, with regard to hydraulic pump control, what is called pump load sensing control is essential so that the differential pressure between the discharge pressure of the hydraulic pump and the maximum load pressure of the plurality of hydraulic actuators (minimum differential pressure) becomes the differential pressure that was set in advance. The idea is to digitize a conventional load sensing system as-is, and to deal with a small differential pressure by shutting off control.

The invention of the present application takes these facts into consideration, and has as a first object to make do with a simple hydraulic circuit, which does not utilize a pressure compensation valve, and to enable the use of an inexpensive, low precision pressure detector, to enable the maintenance of continuous control at all times using simple controls, and to get by without shocking the operator or the mechanical parts, and to cancel the load dependency of a hydraulic actuator flow during combined operation without limiting the control system of the hydraulic pump.

Further, the hydraulic actuator pressure compensation characteristics of all of the above-described prior art are univocally established, and these pressure compensation characteristics cannot be changed according to circumstances. As a result, prior art is unable to satisfy the following requirements.

That is, if we consider work that requires pressure compensation, and work that does not require pressure compensation, for work that requires fine lever control capabilities, such as suspension work, normal surface adjustment work, and finishing work, because the load dependency of the flow (actuator velocity) greatly impacts work efficiency, pressure compensation is required often.

Conversely, when performing release work following excavation, and when moving the cutting edge of the bucket to the next excavation site after dumping the arm, an operator prefers "load-bearing" movement during rough, full-lever operations.

When pressure compensation is constantly applied even during full-lever operations such as these, if the operating lever of a high load shaft is operated even slightly, the discharge pressure of the hydraulic pump rises abruptly at that moment, the dischargeable flow determined by the equivalent horsepower performance of the hydraulic pump drops, and the flow to other drive shafts also increases. This gives rise to the problem of the velocity of the hydraulic actuator on the light load side decreasing more than necessary.

During this kind of full-lever operation, the speed of the light load working machine is required more than split control in accordance with the control input of the operating lever. What is required is believed to be a "load-bearing" split, that is, control that weakens pressure compensation.

Further, an operation performed frequently during hydraulic excavator work is "rough-combing" whereby the surface of the ground is leveled. During this operation as well, an operator prefers to move the cutting edge of the bucket roughly horizontally over the surface of the ground using a full-lever boom-up, arm-excavation operation. If there is no pressure compensation at this point, because there is little pressure for raising the boom, the cutting edge of the bucket moves roughly horizontally over the ground. But when all-out pressure compensation is applied, it gives rise to the problem of the trajectory of the cutting edge of the bucket rising high into a circular arc.

In other words, when the pressure compensation function is put to use univocally, during fine control operations, combined operation can be readily performed using the operating levers without need for concern. However, there is a problem during combined full-lever operations in that speedy, "load-bearing" work cannot be carried out using conventional rough operations.

The present invention takes this fact into consideration, and has as a second object enhancing lever controllability, and improving work efficiency by making it possible to change pressure compensation characteristics of a hydraulic actuator in accordance with operating lever operating status and load pressure.

DISCLOSURE OF THE INVENTION

To achieve the above-mentioned first object, a first invention of the present invention is a control device for a hydraulic drive machine which comprises a hydraulic pump, a plurality of hydraulic actuators provided in correspondence with a plurality of operating members, and a plurality of operating valves for supplying to corresponding hydraulic actuators a pressure oil discharged from the hydraulic pump at a flow rate that accords with control inputs of the operating members, and which drives the hydraulic actuators in accordance with the operation of the operating members, characterized in that the control device comprises:

differential pressure detection means for detecting for each operating valve a differential pressure between a pressure of the pressure oil flowing into the operating valve and a pressure of the pressure oil flowing out of the operating valve;

minimum differential pressure selection means for selecting a minimum differential pressure from among the differential pressures detected by the differential pressure detection means;

correction factor calculation means for calculating for each operating member a correction factor for correcting, on the basis of a ratio between the detected differential pressure of the operating valve and the selected minimum differential pressure, a control input of an operating member corresponding to the operating valve; and control input correction means for correcting the control input of a corresponding operating member using the correction factor calculated by the correction factor calculation means.

That is, in accordance with this configuration, a correction factor for correcting the control input of an operating member that corresponds to this operating valve is calculated for each operating member on the basis of the ratio between the detected differential pressure across an operating valve and a minimum differential pressure selected from among the differential pressures across a plurality of operating valves. And the control input of a corresponding operating member is corrected using this calculated correction factor.

Consequently, the larger the across-valve differential pressure, that is, the smaller the load on a hydraulic actuator, the greater the reduction of control input, which is the drive command value related to that operating valve, and the smaller the aperture area of that operating valve. Thus, the lighter the load on a hydraulic actuator, the more control is applied to the large incoming flow to that hydraulic actuator. This enables the distribution of flow to each hydraulic actuator during combined operation to be in accord with the ratio of the control input of each operating member manipulated by an operator.

More specifically, using the above-described general formula for a hydraulic circuit $Qi=c \cdot Ai \cdot \sqrt{(\Delta Pi)}$ (provided that i is the ith hydraulic actuator, operating valve or operating lever), the control input (drive command value), which specifies the aperture area (Ai), is corrected using a correction factor $Ki=\sqrt{(\Delta Pmin/\Delta Pi)}$. Therefore, the flow Qi, which flows through an operating valve i and is supplied to a hydraulic actuator i becomes $Qi=c \cdot Ai \cdot Ki \cdot \sqrt{(\Delta Pi)}=c \cdot Ai \cdot \sqrt{(\Delta Pmin/\Delta Pi)} \cdot \sqrt{(\Delta Pi)}=c \cdot Ai \cdot \sqrt{(\Delta Pmin)}$, wherein the $\Delta Pi$ nullify one another. Also, here $\Delta Pmin$ stands for minimum differential pressure.

That is, by having as a criteria a common minimum differential pressure $\Delta Pmin$ for all hydraulic actuators, the flow Qi supplied to the ith hydraulic actuator is determined solely by the size of the aperture area command value Ai.

At this point, if the invention of this application is compared with prior art, which utilizes a pressure compensation valve, it is evident that with the invention of this application, hydraulic actuator load dependency during combined operations is canceled without utilizing a pressure compensation valve as in the past. In other words, a simple hydraulic circuit is used without a pressure compensation valve, and costs are reduced.

Further, if we compare the present invention with the prior art disclosed in the above-mentioned Japanese Patent Publication No. 6-41762 and Japanese Patent Publication No. 6-41764, or the invention disclosed in the above-mentioned Japanese Patent Application Laid-Open No. 4-351304, with these prior art, it is necessary to perform a division operation having a differential pressure value $\Delta P$ of zero or near zero as the denominator. In this division operation, the values of the denominator and numerator are not necessarily the same, and the value of the numerator is a considerably larger value than that of the denominator. Consequently, the above-mentioned division operation result in "zero division" and overflow, giving rise to a situation wherein arithmetic processing and control are not possible. By contrast, with the invention of the present application, because a configuration is used whereby the minimum differential pressure is divided by the differential pressure $\Delta P$ detected at each operating valve, the denominator, which is the detected differential pressure, will always be larger than or equal to the numerator, which is the minimum differential pressure. Therefore, the "zero division" and overflow of the above-mentioned division process does not occur, and there can be no circumstances under which arithmetic processing and control become impossible.

Moreover, when division is performed using a number near zero (when the detected differential pressure is the minimum differential pressure), the numerator is also the minimum differential pressure, so the quotient is always 1, and errors contained in a detection error offset one another. Conversely, even when division is performed using a detected differential pressure other than the minimum differential pressure, because the detected differential pressure denominator is larger than the minimum differential pressure numerator, the process is completed with little impact from detection errors. That is, because better-than-constant precision can be ensured even using an inexpensive, low-precision pressure detector, cost reducing effects can be achieved.

Moreover, with the invention of this application, control is performed using a compensation calculation that divides the minimum differential pressure by the detected pressure $\Delta P$ at each operating valve without having to switch from compensation calculation-based control to ordinary control each time there is a switchover to a drive shaft with the minimum across-valve differential pressure. As a result, the drive command values to a hydraulic actuator are continuous during the instant of control switchover, thus solving for the past problem of a shock being generated at each switchover. This achieves the effect whereby control continuity can be maintained via simple control, and the operator and machine parts are not shocked. Moreover, in accordance with the invention of this application, there are no limitations whatsoever placed on the hydraulic pump control system.

Further, to achieve the above-mentioned second object, a second invention of the present invention is a control device for a hydraulic drive machine which comprises a hydraulic pump, a plurality of hydraulic actuators provided in correspondence with a plurality of operating members, and a plurality of operating valves for supplying to corresponding hydraulic actuators a pressure oil discharged from the hydraulic pump at a flow rate that accords with control inputs of the operating members, and which drives the hydraulic actuators in accordance with the operation of the operating members, characterized in that the control device comprises:

differential pressure detection means for detecting for each operating valve a differential pressure between a pressure of the pressure oil flowing into the operating valve and a pressure of the pressure oil flowing out of the operating valve;

correction factor calculation means for calculating for each operating member a correction factor for correcting the control input of the operating member in accordance with the differential pressure detected by the differential pressure detection means;

setting means for setting for each operating member an upper limit value or a lower limit value of the correction factor in accordance with the control input of the operating member; and control input correction means for correcting the control input of a corresponding operating member, using a correction factor of which upper limit or lower limit is limited, so that the correction factor calculated by the correction factor calculation means does not exceed the set upper limit value or lower limit value.

That is, in accordance with this configuration, an upper limit value or lower limit value of the correction factor is set for each operating member in accordance with the control input of the operating member, making it so that a correction factor obtained in accordance with a detected differential pressure does not exceed the above-mentioned set upper limit value of lower limit value, and the control input of a corresponding operating member is corrected using a correction factor, which is limited by this upper limit or lower limit.

As a result of this, when the control input for a operating member (operating lever) is small, as during fine control operation, for example, the pressure compensation function is given full play without the correction factor being limited by an upper limit value or lower limit value. Further, as lever control input becomes larger, the upper limit or lower limit of a correction factor is further limited by an upper limit value or lower limit value, and the pressure compensation function becomes more moderate.

Consequently, the larger the across-valve differential pressure during fine control operation, that is, the smaller the load on a hydraulic actuator, the greater the reduction of control input, which is the drive command value related to that operating valve, and the smaller the aperture area of that operating valve. Thus, the lighter the load on a hydraulic actuator, the more control is applied to the large incoming flow to that hydraulic actuator. This enables the distribution of flow to each hydraulic actuator during combined operation to be in accord with the ratio of the control input of each operating member manipulated by an operator, improves control capabilities during fine control operation, and, in turn, enhances work efficiency.

Conversely, during full-lever operation, unlike at fine control operations, the pressure compensation function is weakened, and the large incoming flow to a hydraulic actuator with a light load is not controlled. In other words, at full-lever operation, since light-load working machine speed is required more than split control in accordance with the control input of an operating lever, by implementing control geared to this requirement, the present invention improves controllability at full-lever operation, and work efficiency is enhanced pursuant thereto.

Further, the above-mentioned limitations placed on the correction factor are not applied in accordance with the lever operating state alone, but rather can also be established in accordance with the load of the working machine. This affords an operator optimum pressure compensation characteristics for the job at hand, enables good control of an operating lever at all times, and dramatically improves work efficiency.

BRIEF DESCRIPTION OF THE DRAWINGS

FIGS. 3 (a), (b) are diagrams showing examples of other configurations of the pressure sensor depicted in FIG. 1;

FIGS. 4 (a), (b) are block diagrams showing examples of configurations of controllers corresponding to FIGS. 3 (a), (b), respectively;

BEST MODE FOR CARRYING OUT THE INVENTION

The following is a description of an embodiment of a control device for a hydraulic drive machine related to the present inventions with reference to the figures.

Furthermore, the hydraulic drive machine in this embodiment presupposes construction equipment such as a hydraulic excavator.

Figure 1:
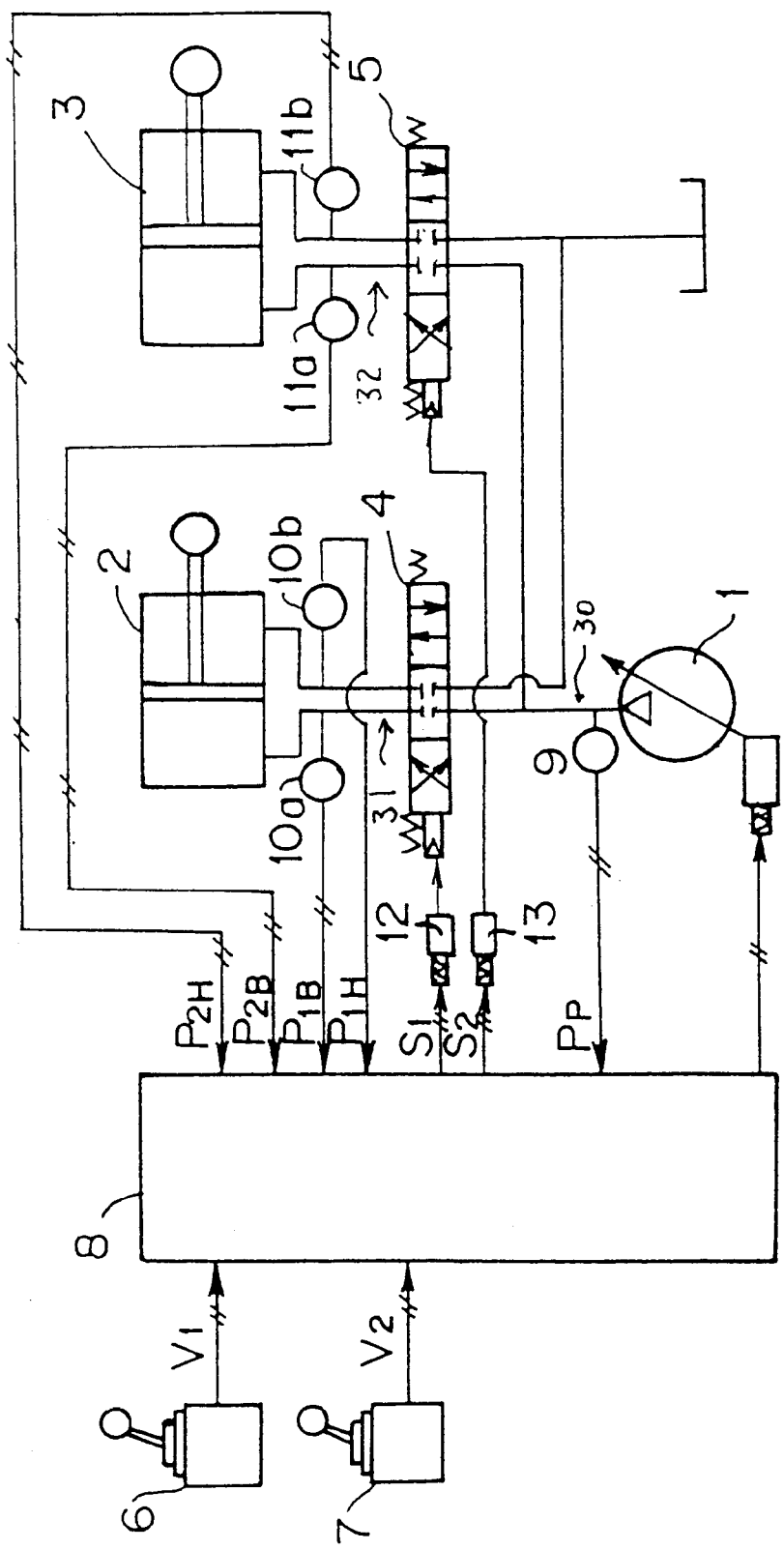
FIG. 1 is a diagram, which shows a configuration of an embodiment of a control device for a hydraulic drive machine related to the present invention, and which shows the configuration at a flow control valve when detecting across-valve differential pressure at the side where flow enters a hydraulic cylinder.

FIG. 1 shows a configuration of a control device for a hydraulic excavator.

As shown in this figure, this device comprises a variable capacity hydraulic pump 1, which is driven by an engine not depicted in the figure, the swash plate inclined rotation angle of which is changed in accordance with a drive command outputted from a controller 8, and the discharge flow of which is changed in accordance thereto; 2 hydraulic cylinders 2, 3 as hydraulic actuators, which are provided corresponding to each of 2 operating levers 6, 7 as operating members; 2 flow control valves 4, 5 as operating valves, which are provided on each of 2 pressure oil supply channels 31, 32 between the hydraulic pump 1 and the above-mentioned hydraulic cylinders 2, 3, and the aperture areas thereof are changed in accordance with drive commands S1, S2 outputted from the controller 8, and which supply to the hydraulic cylinders 2, 3 corresponding thereto a flow of pressure oil corresponding to these changed aperture areas; and a controller 8, which, as described below, performs correction and other processing of control inputs V1, V2 for the above-mentioned operating levers 6, 7, outputs to the flow control valves 4, 5 corresponding thereto drive control signals S1, S2 that accord with these corrected control inputs, and which, in accordance therewith, drives and controls hydraulic cylinders 2, 3 corresponding thereto.

The above-mentioned operating lever 6 is an electric lever for driving a boom (connected to hydraulic cylinder 2), which is a working machine not shown in the figure, and this electric lever outputs an electric signal, which is proportional to the operator-manipulated input. Similarly, operating lever 7 is an electric lever for driving an arm (connected to hydraulic cylinder 3), which is a working machine not shown in the figure, and this electric lever outputs an electric signal, which is proportional to the operator-manipulated input.

A pressure sensor 9, which detects the discharge pressure Pp of the hydraulic pump 1, is positioned on a pressure oil supply channel 30, which bifurcates to the above-mentioned pressure oil supply channels 31, 32.

Further, pressure sensors 10a, 10b, which detect boom load pressures P1B, P1H, are positioned along pressure oil supply channel 31 on the supply channel that runs through the bottom chamber of hydraulic cylinder 2, and on the supply channel that runs through the head chamber of hydraulic cylinder 2, respectively.

Similarly, pressure sensors 11a, 11b, which detect arm load pressures P1B, P1H, are positioned along pressure oil supply channel 32 on the supply channel that runs through the bottom chamber of hydraulic cylinder 3, and on the supply channel that runs through the head chamber of hydraulic cylinder 3, respectively.

Figure 2:
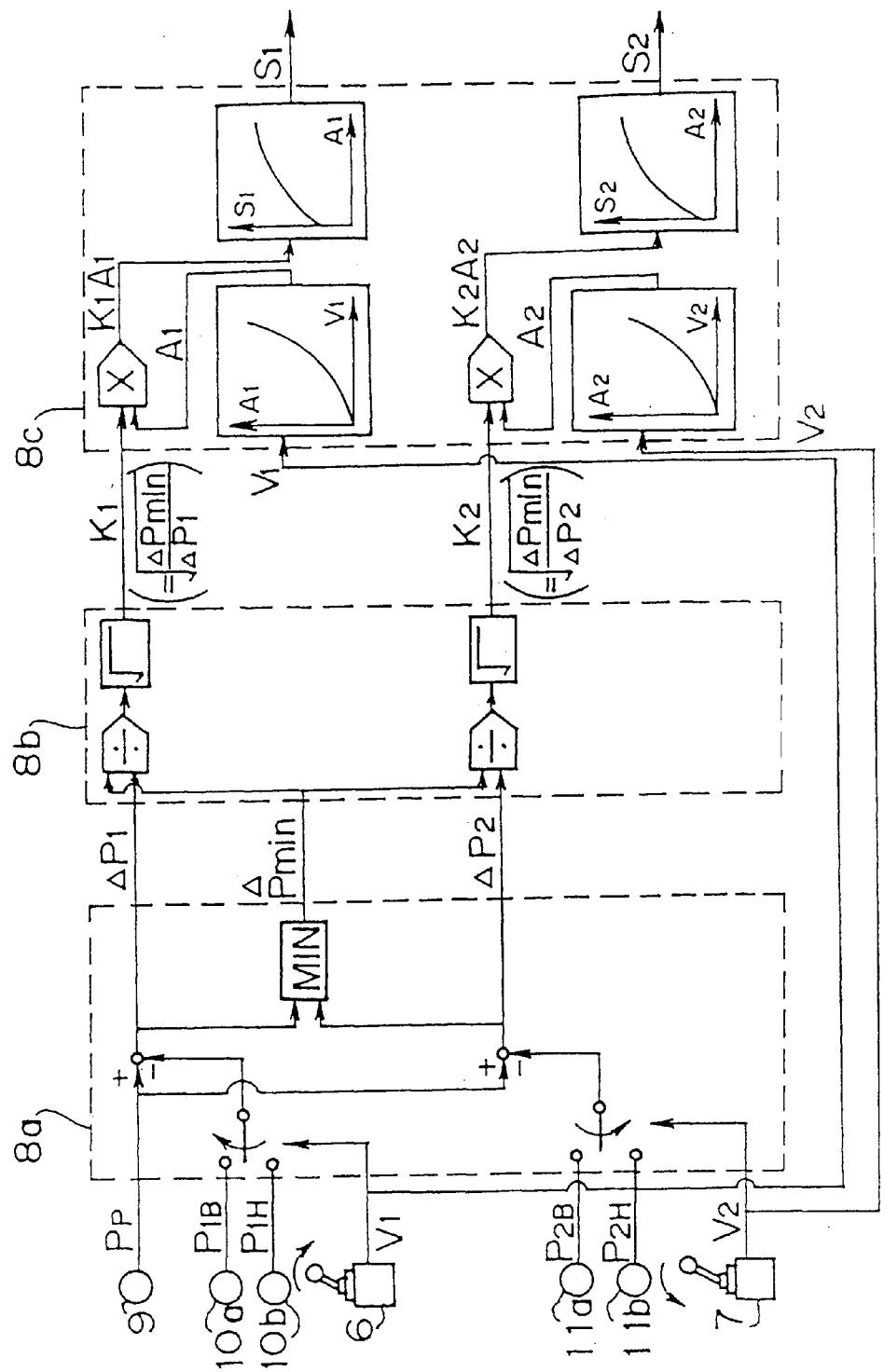
FIG. 2 is a block diagram showing a configuration of the controller depicted in FIG. 1.

The detection signals of each of these pressure sensors are inputted to the controller 8 together with electric signals, which specify the control input of the above-mentioned operating levers 6, 7, and the processing illustrated in FIG. 2 is implemented.

FIG. 2 is a block diagram illustrating the arithmetic processing performed by the controller 8. Also, to expedite the explanation, the arithmetic processing is illustrated as it is performed by each processor, but of course, the system can also be designed so that all processing is performed by software.

Now, as indicated by the arrows in FIG. 2, it is presupposed that operating lever 6 is being operated in the direction that causes the hydraulic cylinder 2 for the boom to extend, and that operating lever 7 is being operated in the direction that causes the hydraulic cylinder 3 for the arm to contract.

Signals, which specify control inputs V1, V2 for operating levers 6, 7, and each of the pressure detection signals Pp, P1B, P1H, P2B, P2H of pressure sensors 9, 10a, 10b, 11a, 11b are inputted to differential pressure calculation means 8a of the controller 8.

Then, in accordance with the direction of operating lever 6 (extension direction), P1B (the bottom chamber side, which is the side from which pressure oil flows into hydraulic cylinder 2) is selected from among P1B, P1H, and the differential pressure across the flow control valve 4 for the boom $\Delta P1=Pp-P1B$ is calculated. Conversely, in accordance with the direction of operating lever 7 (contraction direction), P2H (the head chamber side, which is the side from which pressure oil flows into hydraulic cylinder 3) is selected from among P2B, P2H, and the differential pressure across the flow control valve 5 for the arm $\Delta P2=Pp-P2H$ is calculated.

Thus, once each across-valve differential pressure $\Delta P1$, $\Delta P2$ is calculated, the minimum differential pressure $\Delta Pmin$ is selected therefrom. That is, when $\Delta P1>\Delta P2$, $\Delta Pmin=\Delta P2$, and when $\Delta P1<\Delta P2$, $\Delta Pmin=\Delta P1$.

The across-valve differential pressures $\Delta P1$, $\Delta P2$, and minimum differential pressure $\Delta Pmin$ obtained in this way for each drive shaft are inputted to correction factor calculation means 8b.

Correction factor calculation means 8b calculates the correction factor K1 for correcting the control input V1 of the boom operating lever 6 using $K1=\sqrt{(\Delta Pmin/\Delta P1)}$, and calculates the correction factor K2 for correcting the control input V2 of the arm operating lever 7 using $K2=\sqrt{(\Delta Pmin/\Delta P2)}$.

The above-mentioned correction factors K1, K2 are inputted into drive command value correction means 8c, together with the drive command value control inputs V1, V2 from the operating levers 6, 7.

At this point, the aperture area A1 relative to current control input V1 is determined on the basis of the relationship between a pre-set operating stroke volume (the spool stroke volume of flow control valve 4) V1, and the spool aperture area A1 of flow control valve 4. The aperture area A2 relative to current control input V2 is determined in a similar manner. Here, the relationship of the above-mentioned spool stroke aperture area is univocally determined by the shape of the spool.

The above-mentioned determined correction factors K1, K2 are multiplied by the thus obtained aperture areas A1, A2, respectively, and the corrected aperture areas A1'=A1·K1, A2'=A2·K2 are determined.

Furthermore, spool stroke volumes S1, S2 corresponding to the above-mentioned corrected aperture areas A1', A2' are determined via the inverse relationship of the above-mentioned pre-set spool stroke aperture area, and the signal that specifies this spool stroke volume S1, S2 is applied to the respective solenoids of electromagnetic proportional pilot valve 12, which drives the main spool of the boom flow control valve 4, and electromagnetic proportional pilot valve 13, which drives the main spool of the arm flow control valve 5. As a result of this, pilot pressure proportional to each of the electrical input signals from these pilot valves 12, 13 is applied to flow control valves 4, 5, respectively, and each main spool of flow control valves 4, 5 is driven so as to achieve the above-mentioned aperture areas A1', A2'.

The above-mentioned control is explained using the general formula for a hydraulic circuit $Qi=c \cdot Ai \cdot \sqrt{(\Delta Pi)}$ (provided that Q is the flow that passes through the flow control valve restrictor, c is the flow constant, A is the aperture area of the restrictor, $\Delta P$ is across-valve differential pressure of the restrictor, and i is the ith hydraulic cylinder, flow control valve and operating lever).

That is, it is evident that correcting a control input (drive command value), which specifies an aperture area Ai, means that the flow Qi, which flows through a flow control valve i and is supplied to a hydraulic cylinder i, becomes $Qi=c \cdot Ai \cdot Ki \cdot \sqrt{(\Delta Pi)}=c \cdot Ai \cdot \sqrt{(\Delta Pmin/\Delta Pi)} \cdot \sqrt{(\Delta Pi)}=c \cdot Ai \cdot \sqrt{(\Delta Pmin)}$, and that $\Delta Pi$ items nullify one another.

Thus, by having as a criteria a common minimum differential pressure $\Delta Pmin$ for all hydraulic actuators, the flow Qi, which is supplied to the ith hydraulic actuator, is determined solely by the size of the aperture area command value Ai. This enables the distribution of flow to each hydraulic cylinder during combined operation to be in accord with the ratio of the control input of each operating lever manipulated by an operator, enhances control capabilities during combined lever operations, such as at fine control operation, and improves work efficiency.

In accordance with the embodiment described above, a pressure sensor is installed in each chamber of a hydraulic cylinder, but, as shown in FIG. 3 (a), it is also possible to provide a line 14, which automatically conveys the load pressure of the pressure oil on the side where it flows into a hydraulic cylinder 2, 3 in accordance with the spool stroke direction of a flow control valve 4, 5, and to provide on this line 14 a pressure sensor 10c, 11c, which detects the load pressure P1, P2 of the pressure oil on the side where it flows into a hydraulic cylinder 2, 3. Doing this enables the number of pressure sensors to be reduced. Moreover, in this case, as shown in FIG. 4 (a), the effect produced is such that there is no need to provide a configuration for selecting the bottom pressure P1B (P2B) and the head pressure P1H (P2H) in differential pressure calculation means 8a' of the controller 8, as was required in FIG. 2.

Furthermore, as shown in FIG. 3 (b), the provision of differential pressure sensors 10d, 11d, which directly detect differential pressure ΔP1, ΔP2 between the discharge pressure Pp of the hydraulic pump 1, and the above-mentioned inflow load pressure P1, P2, makes it possible to also omit the installation of a pressure sensor 9 for the hydraulic pump 1. Moreover, in this case, as shown in FIG. 4 (b), the effect produced is such that there is no need to provide a configuration for calculating the differential pressure ΔP1, ΔP2 between the pump discharge pressure Pp and the load pressure P1 (P2) in differential pressure calculation means 8a" of the controller 8, as was required in FIG. 4 (a).

Figure 5A:
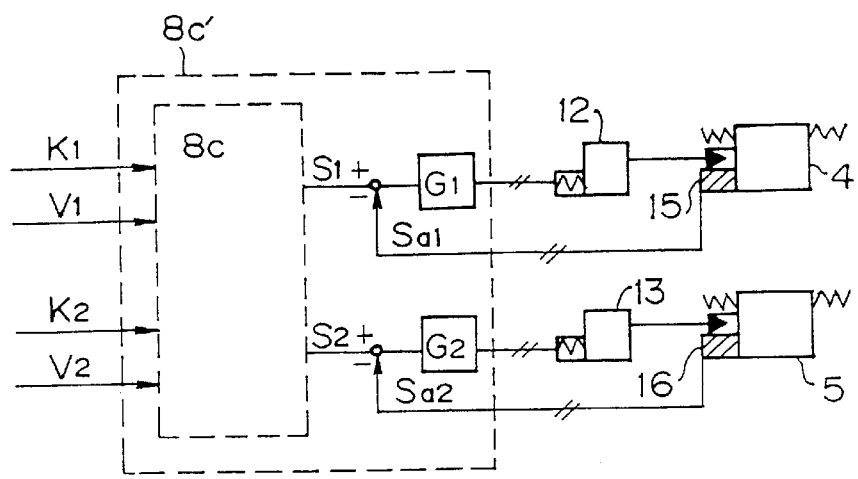
FIGS. 5 (a), (b) are block diagrams showing examples of configurations wherein a flow control valve is being operated using feedback control.
Figure 5B:
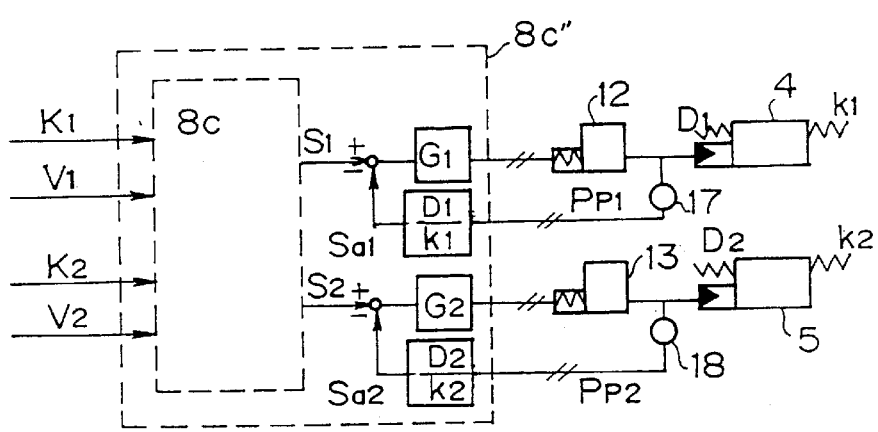

Furthermore, when precision control of the spool aperture area is desired, it is also possible to configure a feedback control system in drive command value correction means 8c' as shown in FIG. 5 (a).

That is, a stroke volume sensor 15, 16, such as a linear potentiometer or a magnetic moving volume sensor, which detects the actual stroke volume Sa1, Sa2 of a spool, is provided in a flow control valve 4, 5, and this detected stroke volume Sa1, Sa2 is used as a feedback volume, and the drive command value S1, S2 is used as a target value. Then, the error between this target value and the above-mentioned feedback volume S1-Sa1, S2-Sa2 is taken, and the product obtained by multiplying feedback gain G1, G2 by these errors is outputted to electromagnetic proportional pilot valves 12, 13, respectively, as control input. In this way, performing feedback control so that the above-mentioned errors S1-Sa1, S2-Sa2 work out to zero makes it possible to precisely match the aperture area to the target aperture area A1', A2'.

Further, a configuration like that shown in FIG. 5 (b) can also be used as another method for detecting actual stroke volume Sa1, Sa2.

That is, in the main spool of a flow control valve 4, 5, pilot pressure is applied from one end, and the spool performs a stroke up to a position where it is in balance with a spring on the opposite side. Thus, actual pilot pressures Pp1, Pp2 are detected in this drive command value correction means 8c" by pilot pressure sensors 17, 18, respectively, and the displacement volumes of the springs (D1/k1)·Pp1, (D2/k2)·Pp2 (here, D1, D2 is the pilot pressure receiving area) are determined by dividing this by the spring constants k1, k2, respectively, and this is used as the actual stroke volume Sa1, Sa2.

For the above-described embodiment, the description was about detecting from among the flows that pass through flow control valves 4, 5 the across-valve differential pressure on the side where pressure oil flows into hydraulic cylinders 2, 3, but across-valve differential pressure may also be detected from among the flows that pass through flow control valves 4, 5 at the side where pressure oil flows out of hydraulic cylinders 2, 3 into a tank.

Figure 6:
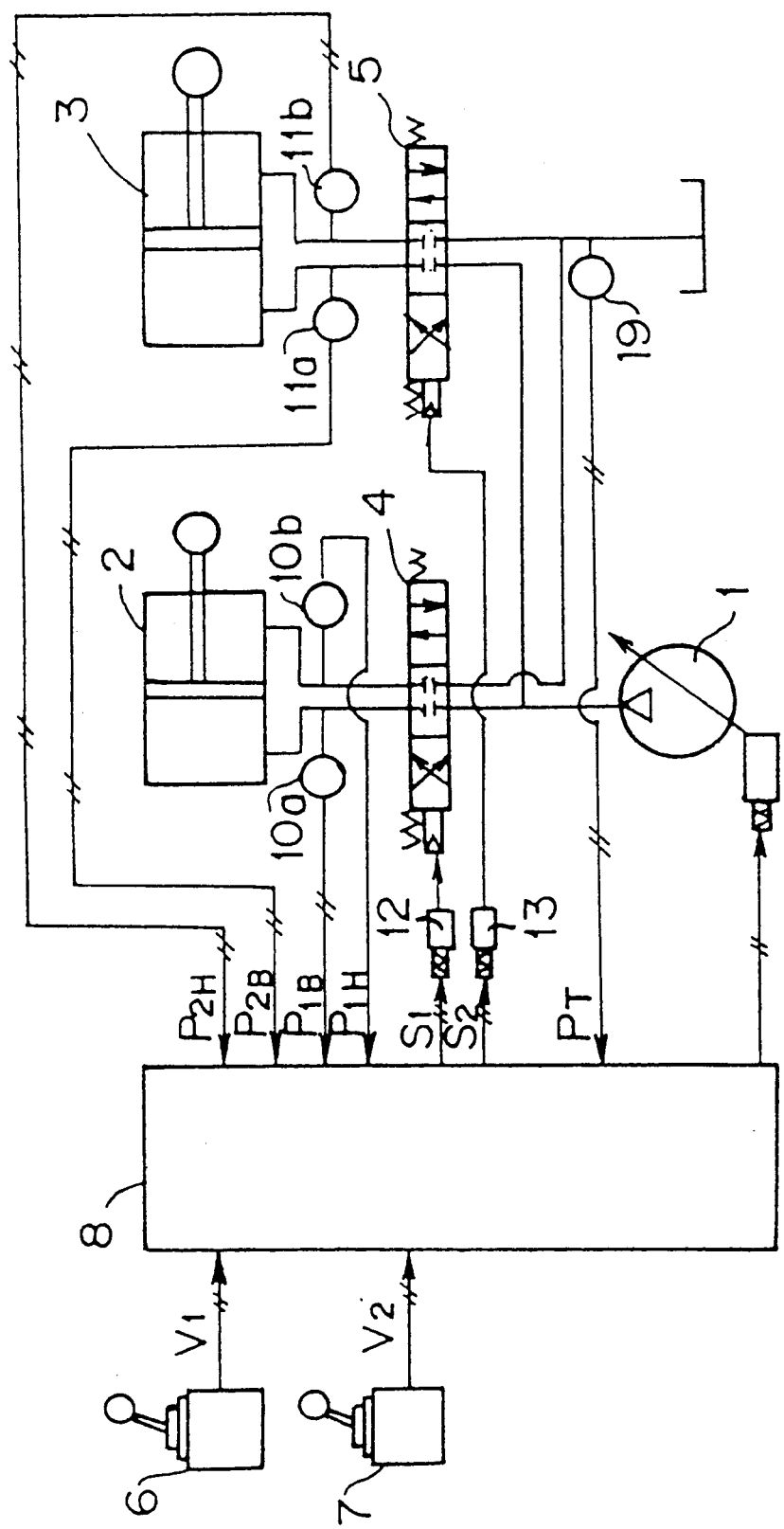
FIG. 6 is a diagram, which shows a configuration of an embodiment of a control device for a hydraulic drive machine related to the present invention, and which shows the configuration at a flow control valve when detecting across-valve differential pressure at the side where flow exits to a tank.
Figure 7:
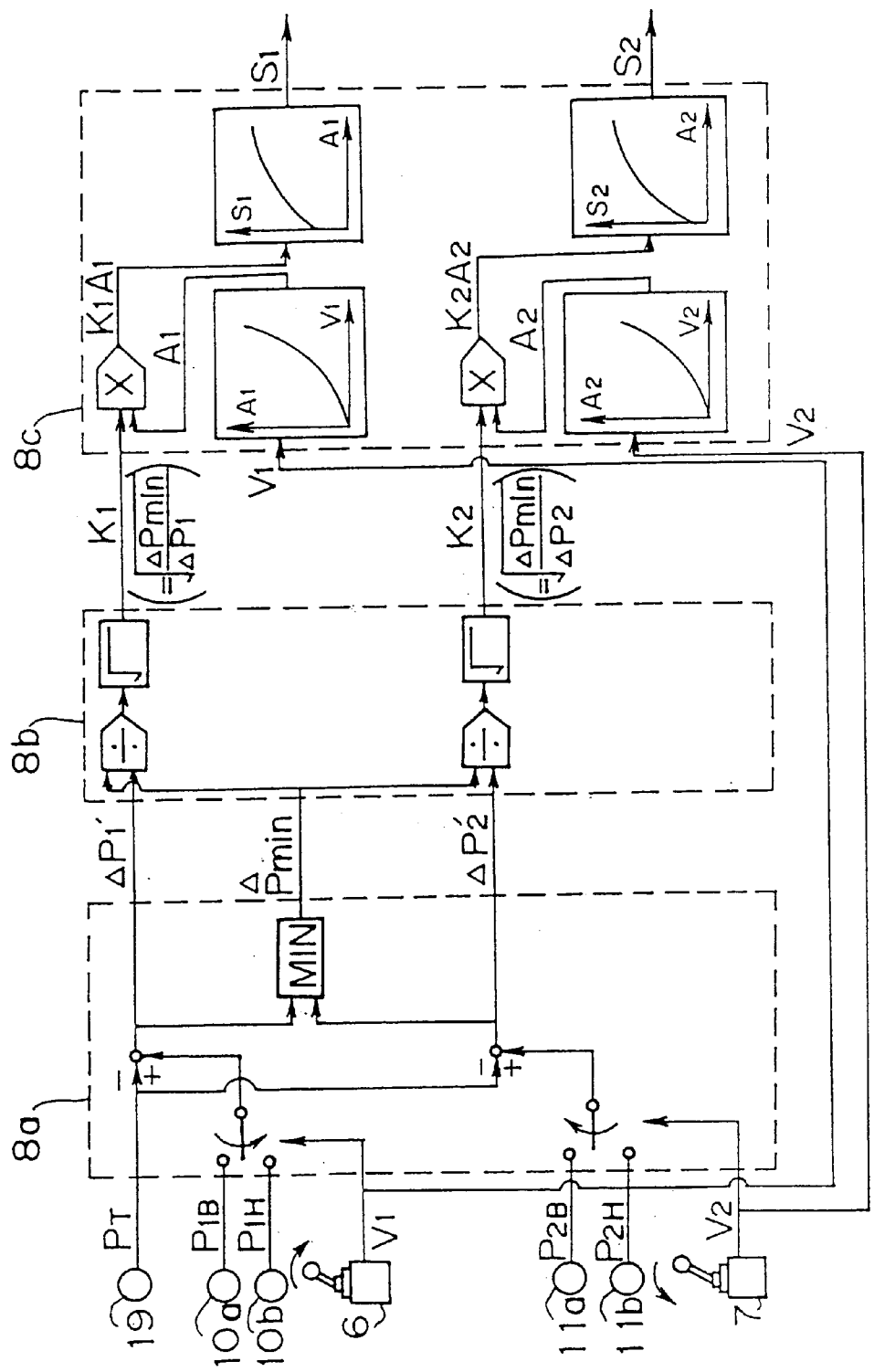
FIG. 7 is a block diagram showing a configuration of the controller depicted in FIG. 6.

FIG. 6 and FIG. 7 are diagrams showing configurations of the embodiment when detecting the across-valve differential pressure of flow control valves 4, 5 on the side where pressure oil flows out to a tank. These figures correspond to the above-mentioned FIG. 1 and FIG. 2, respectively.

FIG. 6 differs from FIG. 1 in that, in place of pressure sensor 9 for the hydraulic pump 1, a pressure sensor 19, which detects tank pressure PT, is provided on a line that passes through the tank.

And in differential pressure calculation means 8a in FIG. 7, P1H (head chamber side, which is the side where pressure oil flows out to a tank) is selected from among P1B, P1H in accordance with the direction of operating lever 6 (extension direction), and the across-valve differential pressure of the boom flow control valve 4 ΔP1=P1H−PT is calculated. Conversely, P2B (bottom chamber side, which is the side where pressure oil flows out to a tank) is selected from among P2B, P2H in accordance with the direction of operating lever 7 (contraction direction), and the across-valve differential pressure of the arm flow control valve 5 ΔP2=P2B−PT is calculated.

Also, when it can be assumed that tank pressure PT=0, the installation of pressure sensor 19 for detecting tank pressure can be omitted.

Figure 8:
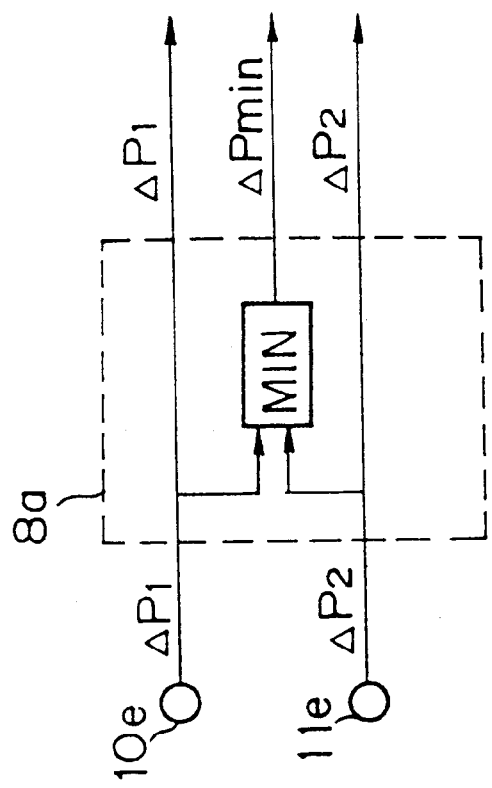
FIGS. 8 (a), (b) is a diagram showing another example of the pressure sensor depicted in FIG. 6, and a block diagram showing an example of a configuration for a controller corresponding thereto.
Figure 8:
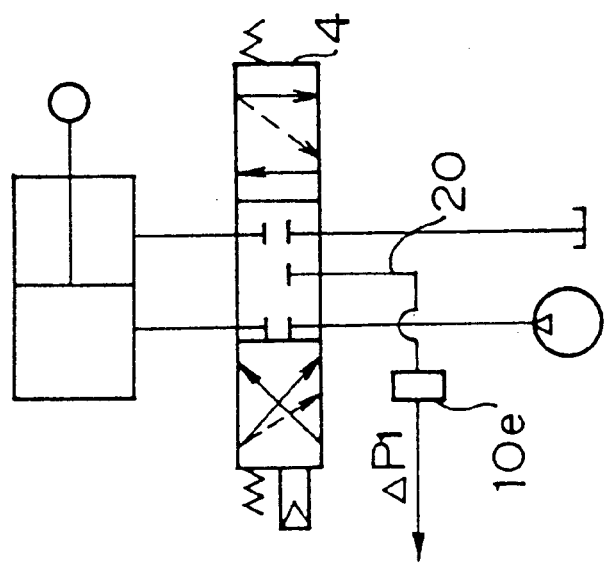

Further, similar to FIG. 3 (b), FIG. 4 (b), it is also possible to provide pressure sensors 10e, 11e, which directly detect differential pressures ΔP1, ΔP2 between load pressures P1, P2 of the pressure oil at the side where it flows out from hydraulic cylinders 2, 3 into a tank, and the tank pressure PT (when treated as=0), as shown in FIG. 8 (a), FIG. 8 (b).

Further, in the above embodiment, operating levers 6, 7 are assumed to be electrical levers, but of course, conventional hydraulic pilot levers can be used in place of electrical levers.

Figure 9:
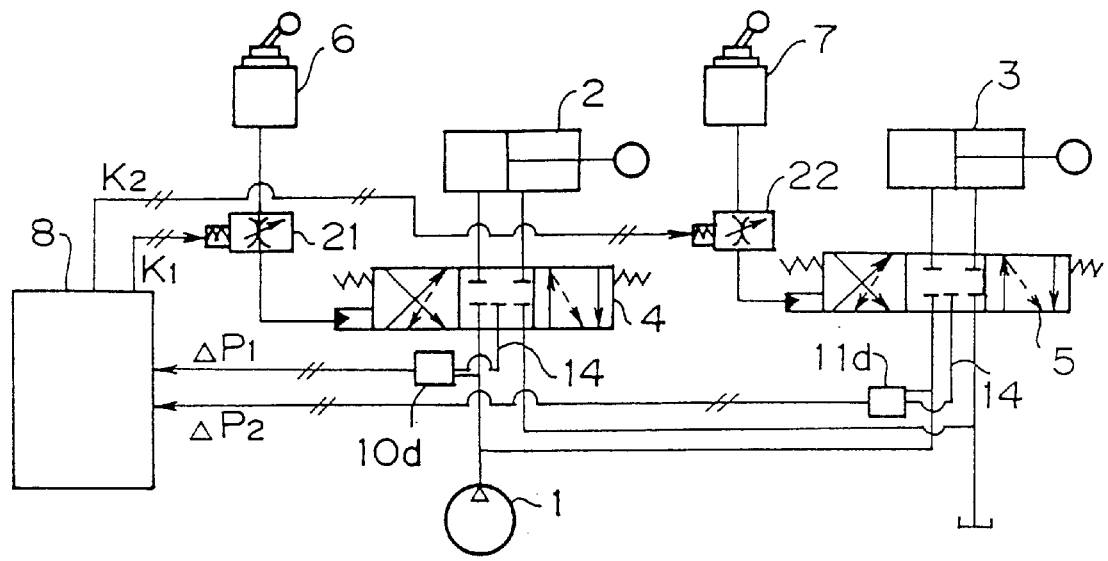
FIG. 9 is a diagram, which shows a configuration of an embodiment of a control device for a hydraulic drive machine related to the present invention, and which shows the configuration when an operating lever is utilized as a hydraulic lever.
Figure 10:
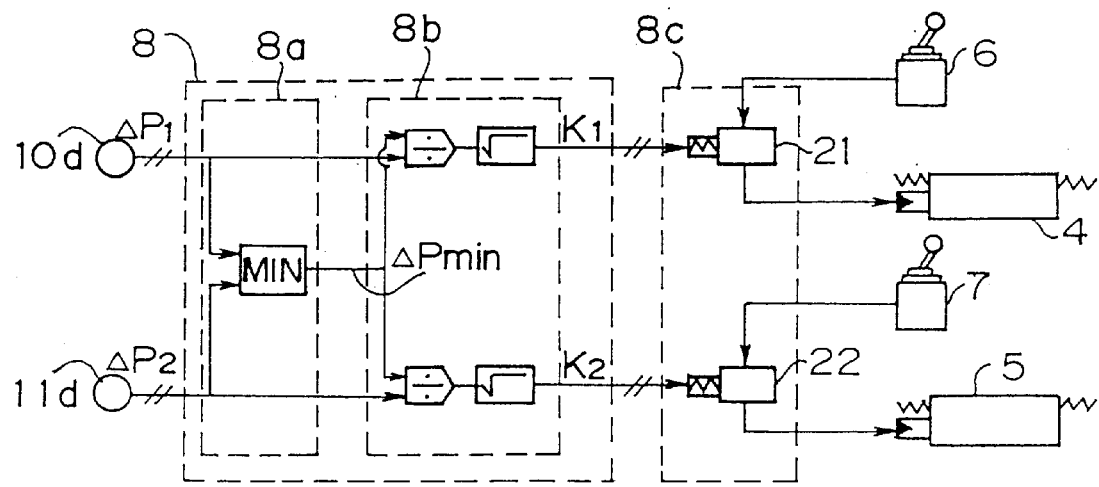
FIG. 10 is a block diagram showing the configuration of the controller depicted in FIG. 9.

FIG. 9, FIG. 10 are diagrams showing a configuration of an embodiment that uses a hydraulic pilot lever, and correspond to the above-mentioned FIG. 1, FIG. 2, respectively.

Pilot pressure proportional to lever control input is outputted from hydraulic pilot levers 6, 7 shown in FIG. 9 to electromagnetic pressure reducing valves 21, 22, respectively, and the pilot pressure is applied via these electromagnetic pressure reducing valves 21, 22 to flow control valves 4, 5, respectively.

Differential pressures ΔP1, ΔP2 between pump pressure Pp and load pressures P1, P2 on the hydraulic cylinder inflow side are detected by pressure sensors 10d, 11d, respectively, and these detected differential pressures ΔP1, ΔP2 are each inputted to the controller 8.

Conversely, the minimum differential pressure ΔPmin is determined from among inputted detected differential pressures ΔP1, ΔP2 by differential pressure calculation means 8a of controller 8 in FIG. 10, and the square roots of the ratios of the differential pressures and the minimum differential pressure √(ΔPmin/ΔP1), √(ΔPmin/ΔP2), respectively, are determined for each drive shaft by correction factor calculation means 8b. Signals, which specify these determined correction factors K1, K2, which are valued from 0 to 1.0, are outputted as drive control values to both electromagnetic pressure reducing valves 21, 22, which are the drive command value correction means 8c.

With the electromagnetic pressure reducing valves 21, 22, when the inputted drive command value K1, K2 is 1.0, the valve is driven so as not to reduce the pilot pressure from the hydraulic levers 6, 7, and as the inputted drive command value K1, K2 approaches 0, the valve is driven so as to further reduce pilot pressure.

In this way, the larger the differential pressure of a drive shaft compared to the minimum differential pressure, that is, the smaller √(ΔPmin/ΔP1), √(ΔPmin/ΔP2), the more the pilot pressure outputted from operating levers 6, 7 is reduced by the above-mentioned electromagnetic pressure reducing valves 21, 22, and the more the aperture areas of flow control valves 4, 5 are reduced. This prevents the inflow of a large amount of pressure oil to a light-load actuator during combined operation of the operating levers.

With the embodiment shown in FIG. 9, FIG. 10, because the aperture area characteristics of a flow control valve relative to pilot pressure are not taken into consideration, compared to the configurations in FIG. 1, FIG. 2, there are cases where the pressure compensation function cannot be utilized to the fullest, but this is advantageous in that simply adding a pressure sensor, electromagnetic valve, and simple controller to conventional construction equipment operated by hydraulic levers enables pressure compensation to be achieved, albeit artificially, and cost reductions can be expected.

The above has described how to use flow control valves to distribute, in accordance with the ratio of control input from a plurality of operating levers, the flow of pressure oil discharged from a variable capacity hydraulic pump 1. The following describes an embodiment concerned with how to control a variable capacity pump 1 when carrying out this pressure compensation control.

One control system for a hydraulic pump is called positive control.

Figure 11:
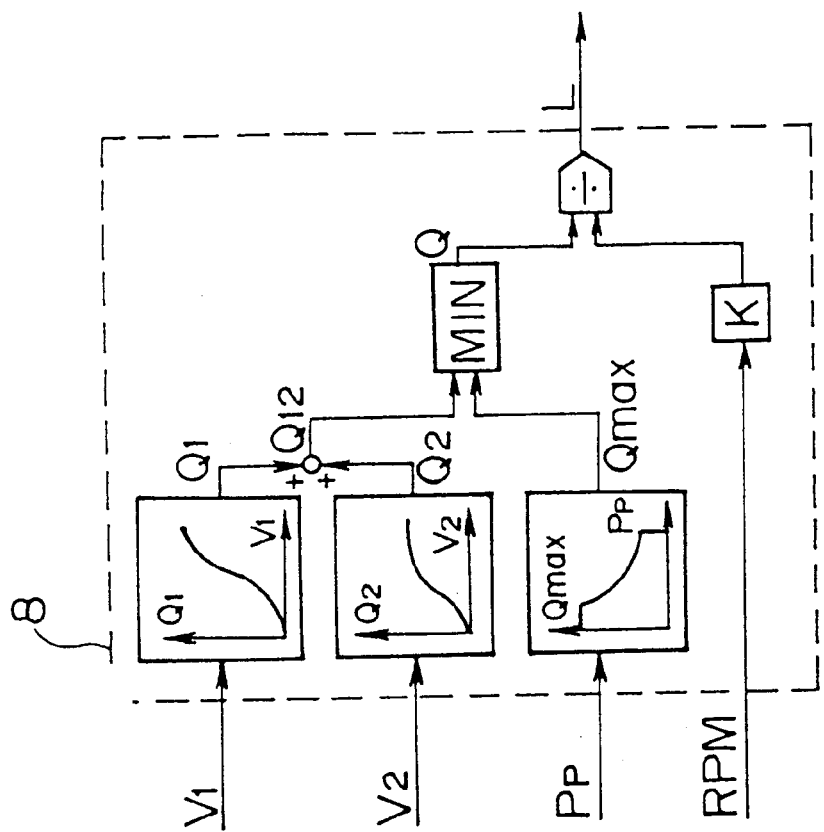
FIGS. 11 (a), (b) are block diagrams used to describe hydraulic pump control.
Figure 11:
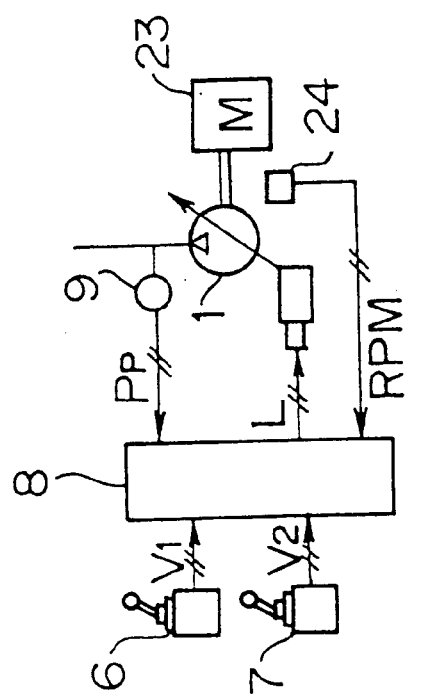

This positive control system is a control system, whereby a lever control input by an operator is applied to the hydraulic pump as a demand. A positive control system is shown in FIGS. 11 (*a*), (*b*).

That is, drive command values V1, V2 are inputted to a controller 8 as control input from operating levers 6, 7, and a number of revolutions signal RPM from a revolution sensor 24, which detects the actual number of revolutions of an engine 23, as well as a pump discharge pressure signal Pp from a pressure sensor 9, are also inputted to the controller 8. Then, as shown in FIG. 11 (*b*), demand flows Q1, Q2 related to the respective drive command values V1, V2 are determined from a stored table, which specifies the drive command value–demand flow relationship, and the sum of these Q1, Q2 is the total flow Q12.

At this point, the hydraulic pump 1 cannot output horsepower in excess of the horsepower currently being outputted by the engine 23. In other words, the maximum value of horsepower is limited by a maximum value Qmax on an equivalent horsepower curve of a P–Q chart, which is a relational expression of the discharge pressure Pp of the hydraulic pump 1 and the discharge flow Q. Thus, the smaller of the above-mentioned total demand flow Q12 and above-mentioned maximum value Qmax is selected, and this selected flow is used as the dischargeable flow Q for the hydraulic pump 1.

Conversely, if displacement volume per revolution is expressed as q (cc/rev), the discharge volume Q (cc/min) of the pump can be expressed as Q=q·RPM. On the other hand, if L is the swash plate position (inclined rotation angle) and k stands for a constant, a relationship is formed whereby q=K·L. According to both of these relational expressions, when engine speed is RPM, a discharge command (swash plate position command) wherein L=Q/(k·RPM) can be outputted to the hydraulic pump 1 to discharge the above-mentioned dischargeable discharge volume Q.

This enables a pressure oil flow, which accords with lever operations by an operator, to be discharged from the hydraulic pump 1, and for split control to be performed by the above-described flow control valves 4, 5 relative to the discharged pressure oil.

Figure 12:
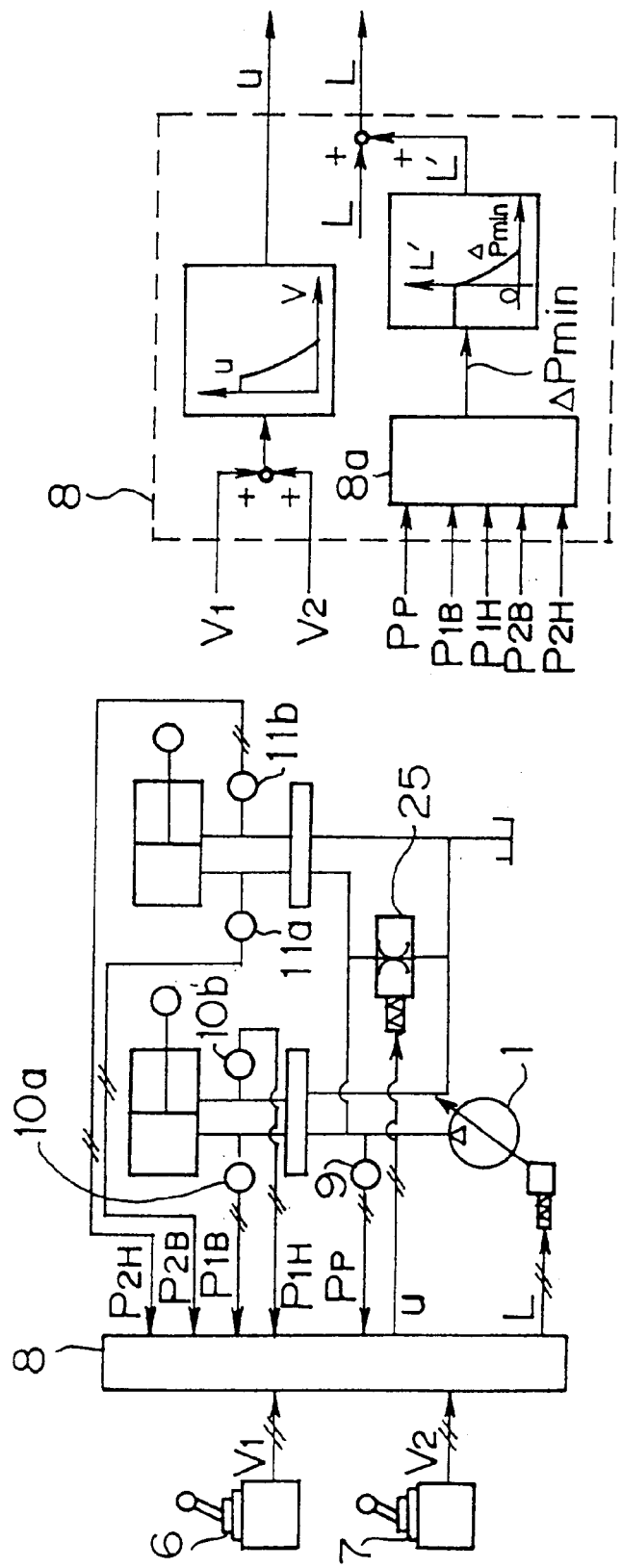
FIGS. 12 (a), (b) are block diagrams used to describe another hydraulic pump control.

Further, as shown in FIG. 12 (*a*), control of the hydraulic pump 1 can also be performed stably by providing an unload valve 25 on the line that connects to a tank.

In this case, the controller 8 controls the unload valve 25 (See FIG. 12 (*b*)) so as to apply an unload command value u to the solenoid of the unload valve 25 so that when operating levers 6, 7 are neutral, the minimum discharge volume of the hydraulic pump 1 flows in its entirety into the tank via the unload valve 25, and as the control inputs V1, V2 of operating levers 6, 7 increase, the flow from the unload valve 25 to the tank becomes smaller. As a result of this, responsiveness is good when a control lever is first operated from neutral, work machine jump can be prevented, and stable hydraulic pump control becomes possible.

Further, when the minimum differential pressure ΔPmin achieved by the controller 8 is extremely small, or is a negative value, the least differential pressure can be actively maintained at the minimum differential pressure drive shaft by applying control so as to make the above-mentioned unload flow u small, or by applying control that increases the discharge flow Q of the hydraulic pump 1 (See FIG. 12 (*b*)).

Another method of controlling a hydraulic pump is load sensing control.

This load sensing control controls the discharge volume of the hydraulic pump so that the hydraulic pump discharge pressure only increases a prescribed value more than the maximum load pressure inside a hydraulic actuator during operation.

Figure 13:
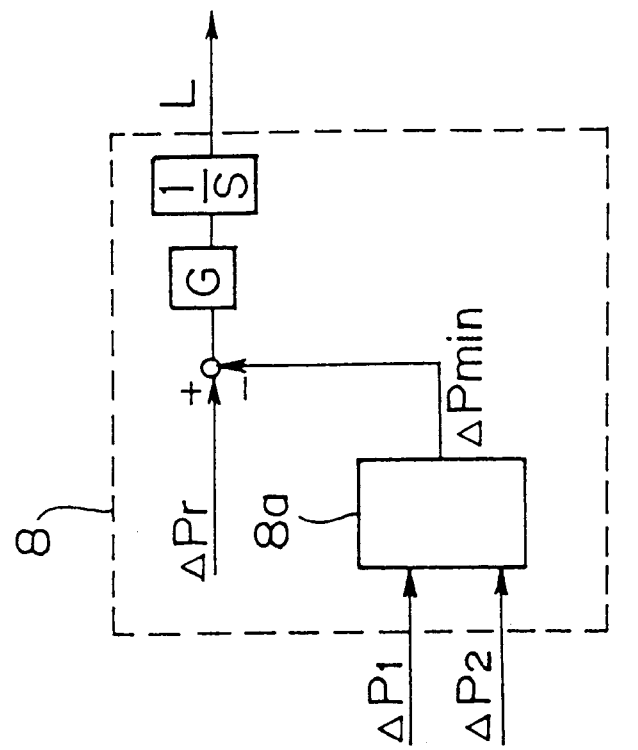
FIGS. 13 (a), (b) are block diagrams used to describe yet another hydraulic pump control.
Figure 13:
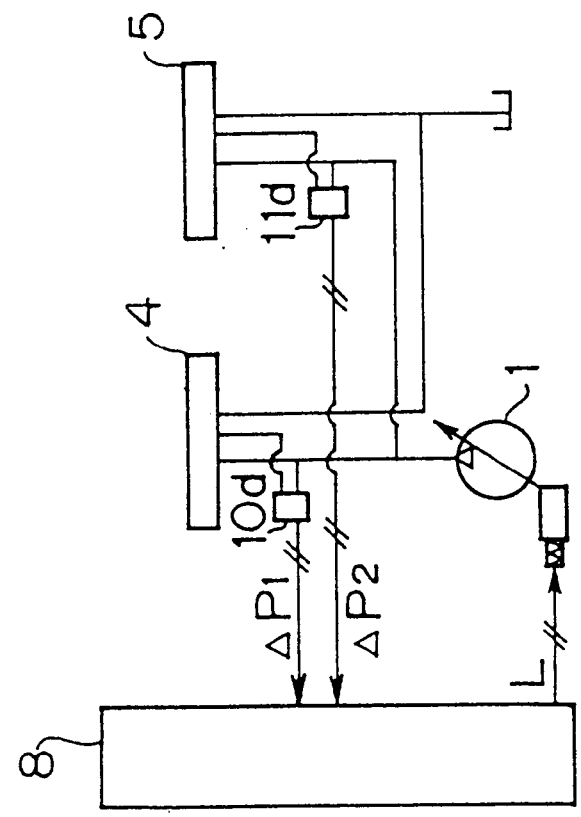

FIGS. 13 (*a*), (*b*) show an embodiment which uses this load sensing control.

That is, differential pressures ΔP1, ΔP2 across flow control valves 4, 5, respectively, are inputted to the controller 8, and the minimum differential pressure is determined by differential pressure calculation means 8*a* as described above. Then, the deviation ΔPr–ΔPmin between a prescribed target differential pressure ΔPr (for example, 20 kg/cm$^2$) and the above-mentioned minimum differential pressure ΔPmin is determined, and the result of performing integration processing on the product of multiplying this deviation by control gain G is used as a pump swash plate position command L. This enables conventional pump load sensing control to be achieved electrically.

With the above-mentioned load sensing control, the variable capacity hydraulic pump 1 attempts to maintain the minimum differential pressure ΔPmin at a fixed value ΔPr at all times, but there are times when an operator requires a large flow, and when flow saturation occurs, the hydraulic pump becomes incapable of maintaining a prescribed minimum differential pressure.

However, even in a situation such as this, as has already been explained above, since the actual minimum differential pressure ΔPmin is detected, and that value is used as a reference to carry out split control, the flow can always be split in accordance with the ratio of lever operation by an operator. In other words, full use is made of an electronic pressure compensation function.

Next, an embodiment, which enables the above-mentioned pressure compensation function to be strengthened or weakened in accordance with the work, and pressure compensation characteristics to be changed in accordance with the situation, is explained.

Figure 14A:
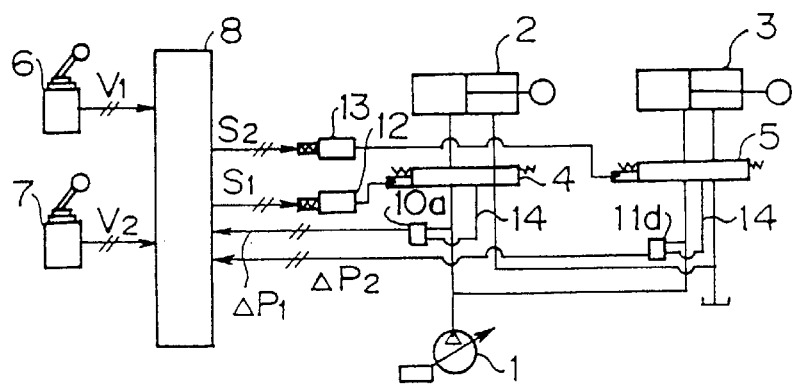
FIGS. 14 (a), (b) is a diagram showing a configuration of an embodiment of a control device for a hydraulic drive machine related to the present invention, and a diagram showing the configuration when the degree of pressure compensation is varied.
Figure 14B:
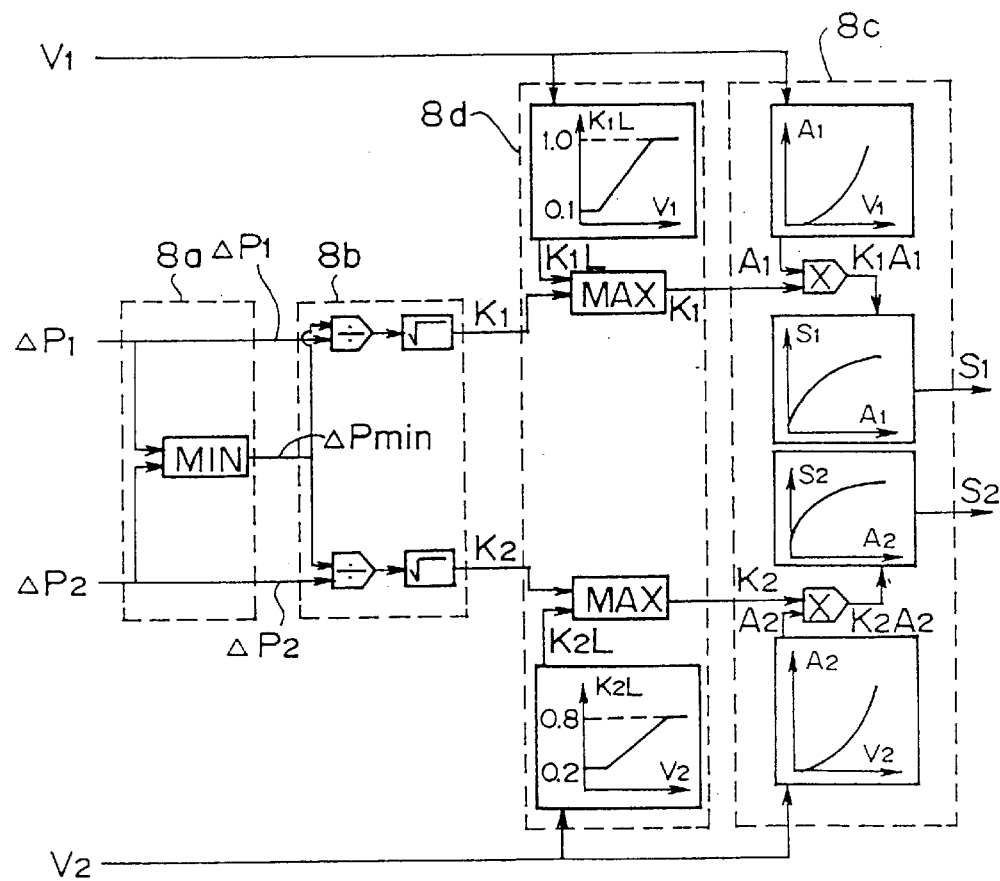

First, an embodiment, which changes the pressure compensation characteristics in accordance with the control input of an operating lever is explained initially with reference to FIGS. 14 (a), (b). Also, since symbols that are the same as those explained above possess the same functions, for convenience sake, repetitive explanations are omitted.

As shown in FIG. 14 (a), a signal, which specifies control inputs V1, V2 of operating levers 6, 7, and a signal, which specifies differential pressures ΔP1, ΔP2 detected by differential pressure sensors 10d, 11d, are inputted to the controller 8, and, as shown in FIG. 14 (b), processing, which circumscribes, in accordance to lever control input, the lower limit of a correction factor K calculated by correction factor calculation means 8b, is implemented in a correction factor controller 8d, which is provided between correction factor calculation means 8b and drive command value correction means 8c.

That is, a correction limit table, which specifies a relationship wherein correction limit values K1L, K2L increase in the range between 0–1.0 as control inputs V1, V2 of operating levers 6, 7 increase, is provided in advance in the correction factor controller 8b. Accordingly, correction limit values corresponding to current control inputs V1, V2, respectively, are read out from the above-mentioned table, and the size of this read-out boom limit value K1L, arm limit value K2L is compared, respectively, to the size of each of the boom, arm correction factors K1, K2 outputted from correction factor calculation means 8b, and the largest of the correction limit value and correction factor is selected and outputted to drive command value correction means 8c.

If the boom is used as an example, because the above-mentioned correction limit value K1L is near 0 at lever fine control (when V1 is small), correction factor K1 is larger, and correction factor K1 is selected. As lever control input V1 increases, the correction limit value K1L also increases, thereby steadily narrowing the range of correction factor K1. At full lever operation, correction factor Ki is forcibly set to 1, and the system switches over to a state wherein control input V1 is not corrected.

As described above, control, which makes full use of pressure compensation at fine control operation, and cuts off pressure compensation at full lever operation, is performed continuously in proportion to lever control input, making lever operability good no matter how large the lever control input, thus enhancing work efficiency.

Another embodiment for this type of lever-sensitive variable pressure compensation control is explained with reference to FIG. 15.

Now, it is presupposed that the current control system of a hydraulic pump is a load sensing system, and the discharge pressure of the hydraulic pump is controlled so that it increases only a prescribed target differential pressure ΔPr higher than the maximum load pressure. In this case, correction factors K1, K2 can be determined directly from the above-mentioned prescribed target differential pressure ΔPr without finding the minimum differential pressure ΔPmin.

Figure 15:
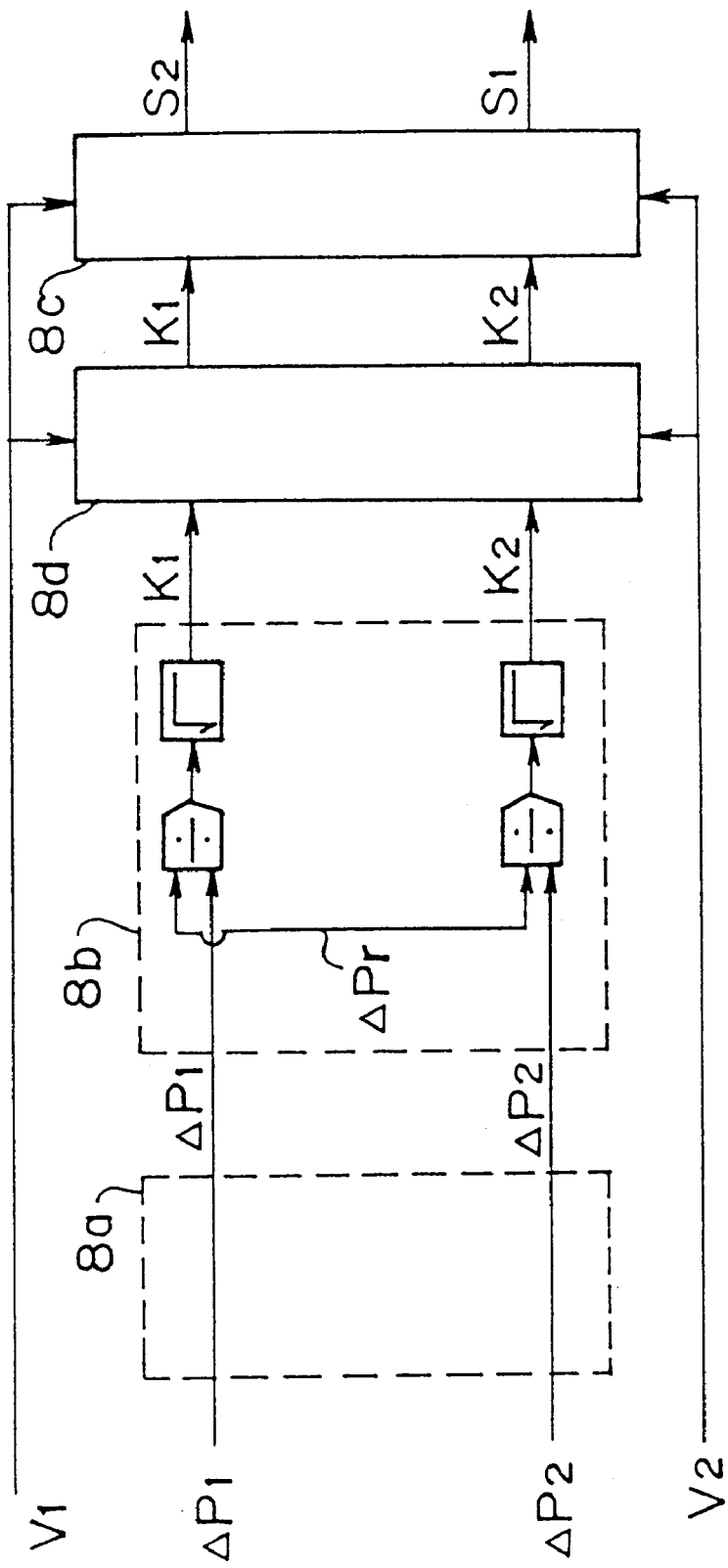
FIG. 15 is a diagram, which shows a configuration of an embodiment of a control device for a hydraulic drive machine related to the present invention, and which shows the configuration when the degree of pressure compensation is varied.

That is, as shown in FIG. 15, each correction factor K1, K2 is determined directly by correction factor calculation means 8b from the ratio between the differential pressure of each shaft ΔP1, ΔP2, and the prescribed target differential pressure ΔPr, without using differential pressure calculation means 8a to find the minimum differential pressure ΔPmin.

Then, in the same correction factor controller 8d as that depicted in FIG. 14, the lower limits of correction factors K1, K2, which were calculated using correction factor calculation means 8b, are calculated in accordance with lever control inputs V1, V2.

As described above, even in the embodiment depicted in FIG. 15, similar to that shown in FIG. 14, control, which makes full use of pressure compensation at fine control operation, and cuts off pressure compensation at full lever operation, is performed continuously in proportion to lever control input, producing the effect, whereby lever operability is good no matter how large the lever control input, and work efficiency improves.

Further, another embodiment for this type of lever-sensitive variable pressure compensation control is explained with reference to FIG. 16.

Figure 16:
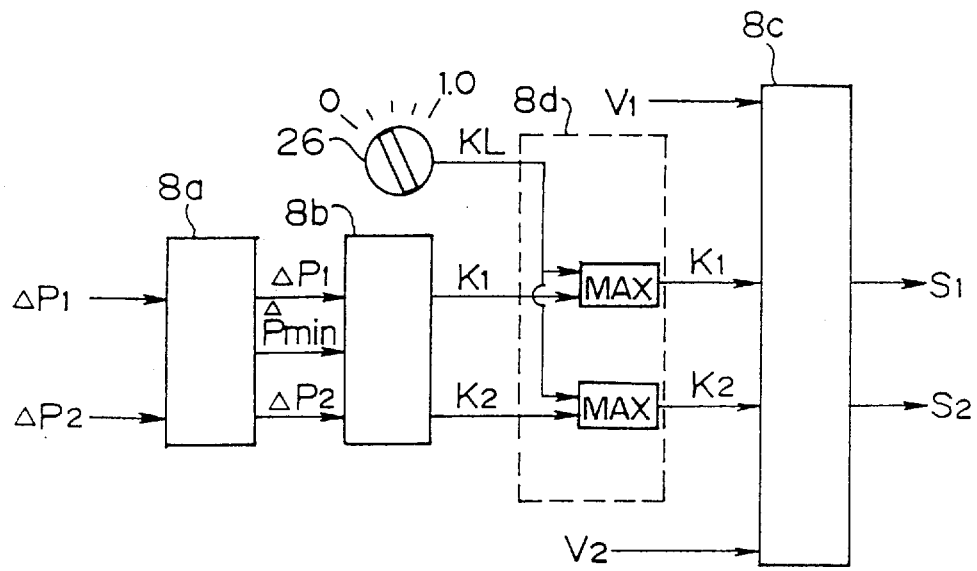
FIG. 16 is a diagram, which shows a configuration of an embodiment of a control device for a hydraulic drive machine related to the present invention, and which shows the configuration when the degree of pressure compensation is varied.

That is, in place of the correction limit table depicted in FIG. 14, a setting apparatus, which manually sets a correction limit value KL, which limits correction factors K1, K2, is provided in FIG. 16. This enables the operator to arbitrarily select the degree of pressure compensation in accordance with the job.

Now, when a correction limit value KL is set to "0" by the setting apparatus, correction factors K1, K2 outputted from correction factor calculation means 8b are always given preference as a result of size comparison by the correction factor controller 8d, allowing pressure compensation to work to the fullest. But since correction factors K1, K2 outputted from correction factor calculation means 8b are less than 1 when correction limit value KL is set to "1" by the setting apparatus, the result of size comparison is always the set value of "1," and aperture area correction is not performed by drive command value correction means 8c. That is, "load-bearing" flow distribution is performed without pressure compensation coming into play.

Figure 17:
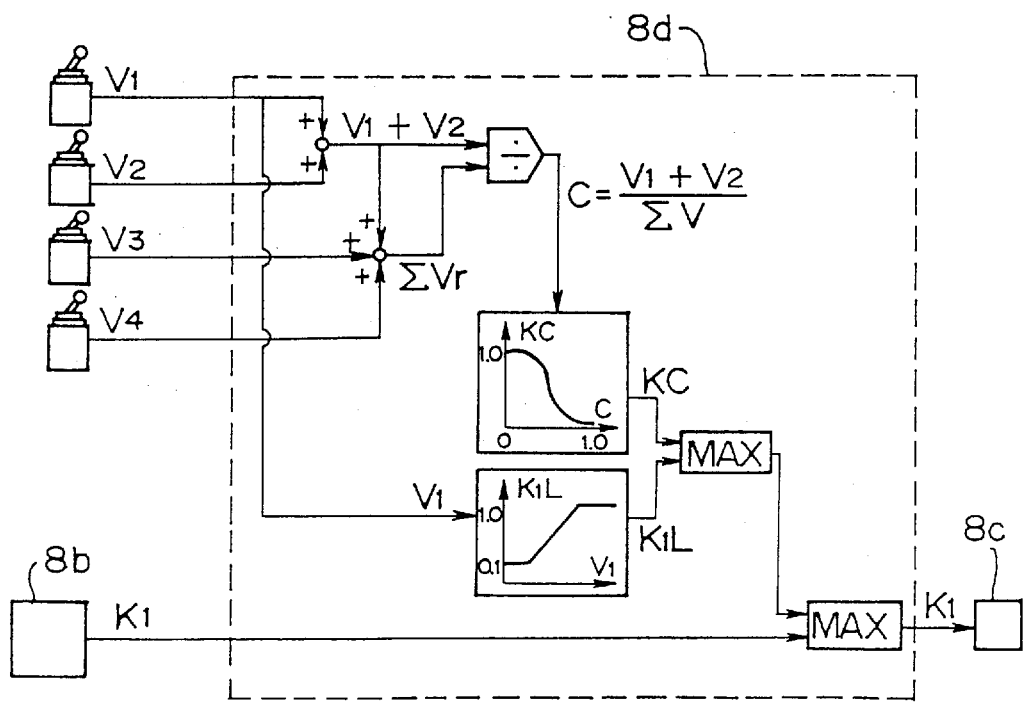
FIG. 17 is a diagram, which shows a configuration of an embodiment of a control device for a hydraulic drive machine related to the present invention, and which shows the configuration when the degree of pressure compensation is varied.

Next, an embodiment, which performs the above-mentioned lever-sensitive variable pressure compensation control only when combined operation is carried out for a specific lever alone, is explained with reference to FIG. 17.

Now, it is presupposed that the hydraulic drive machine comprises four hydraulic actuators, boom, arm, bucket, swing, and that control inputs V1, V2, V3, V4, respectively, are outputted to a controller 8 from various operating levers corresponding to each hydraulic actuator.

Accordingly, lever-sensitive variable pressure compensation control is performed for the boom only when the two shafts of the boom and arm are operated in combination.

That is, on the basis of the various operating lever signals V1, V2, V3, V4 inputted to the correction factor controller 8d, the sum ΣV of control input of all in-operation operating levers, and the sum V1+V2 of control input of the 2 operating levers of the boom and arm are calculated in the respective adders. Then, the ratio of these sums is obtained, and the ratio of the sum of the control input of the 2 boom and arm operating levers is determined relative to total lever control input during combined operation $c=(V1+V2)/\Sigma V$.

Meanwhile, a correction limit table, which specifies the relationship between the above-mentioned determined ratio c and correction limit value Kc, is provided in advance. With this correction limit table, the relationship is such that when ratio c is 0, output Kc is 1, and as ratio c approaches 1, output Kc becomes smaller. Accordingly, correction limit value Kc outputted from this correction limit table is compared with a boom limit value K1L determined from control input V1 of the boom operating lever just as shown in FIG. 14, and the largest of these values is selected. Furthermore, this selected value is compared with correction factor K1 outputted from correction factor calculation means 8b, and the largest of these values is selected and outputted.

In accordance with the above-mentioned configuration, when shafts other than the boom and arm are simultaneously operated in combination, since ratio c assumes a small value less than 1, this results in correction limit value Kc assuming a value close to 1. Furthermore, the size of correction limit value Kc, which is close to 1, is compared with the size of correction limit value K1L, which is less than 1, and correction factor K1, and the largest value is outputted. Consequently, since correction factor K1 is ultimately limited to a value close to 1, and this value is corrected by multiplying it by the aperture area A1, the result is that pressure compensation is not effective.

Conversely, when shafts other than the boom, arm are not operated in combination, ratio c becomes 1, and correction limit value Kc becomes a value approaching 0. Consequently, at size comparison, this correction limit value Kc is ignored, and correction factor K1 is subject to control by correction limit value K1L, which accords with the operation of the boom operating lever.

Further, when the boom or arm is operated independently, correction limit value Kc approaches 0, and since the minimum differential pressure ΔPmin matches up with self-detected differential pressure ΔP1 in correction factor calculation means 8b, correction factor K1 becomes 1, and, without recourse to correction limit values Kc, K1L, aperture area correction is not performed.

As described above, lever-sensitive variable pressure compensation control is performed only when 2 shafts, the boom and arm, are operated in combination.

Now, excavation work, whereby a predetermined locus is excavated while applying a certain degree of load pressure, is considered work that requires pressure compensation. However, on the other hand, for work conditions outside such excavation operations, there are users and operators, who for some time now have requested characteristics without pressure compensation from the standpoints of improving fuel consumption and facilitating rough operations.

From this perspective, a configuration, which makes variable pressure compensation load pressure sensitive rather than lever sensitive, and which applies pressure compensation only when load is applied to a working machine, is also possible.

An embodiment for this type of load pressure-sensitive variable pressure compensation control is explained with reference to FIG. 18. Also, this embodiment presupposes that this control is implemented for a boom only.

Figure 18:
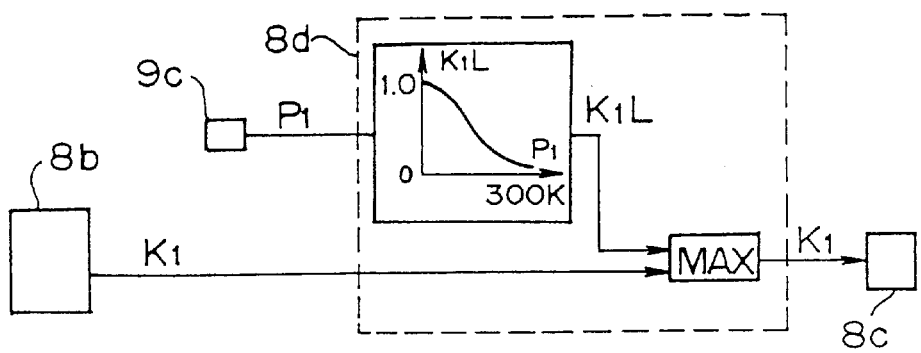
FIG. 18 is a diagram, which shows a configuration of an embodiment of a control device for a hydraulic drive machine related to the present invention, and which shows the configuration when the degree of pressure compensation is varied.

That is, as shown in this FIG. 18, boom load pressure P1 detected by a pressure sensor 9c is inputted to a correction factor controller 8d in the controller 8. Meanwhile, a limit value table, which specifies the relationship between load pressure P1 and correction limit value K1L, wherein the lower the load pressure P1, the closer correction limit value K1L gets to 1, and as load pressure P1 increases, correction limit value K1L approaches 0, is provided in the correction factor controller 8d. Accordingly, a correction limit value K1L corresponding to the current load pressure P1 is outputted from the correction limit value table, and the size of this outputted value is compared with the size of correction factor K1 outputted from correction factor calculation means 8b, the largest of these values is selected, and outputted to drive command value correction means 8c.

In accordance with the above-mentioned configuration, since correction factor K1 is considered 1 when the load on the boom is light, pressure compensation becomes ineffective, but as the boom load pressure becomes higher, the degree of pressure compensation steadily increases. In other words, since pressure compensation is fully effective when performing excavation work, wherein a predetermined locus is excavated while applying a certain degree of load pressure, and pressure compensation ceases to be effective when performing light load work that falls outside of such excavation operations, the above-mentioned excavation work can be performed efficiently, and improved fuel consumption and the facilitation of rough operations can be expected during light-load work.

The preceding has described a situation wherein the range of correction factors K1, K2 is limited, but this same variable pressure compensation control can also be carried out by limiting the detected differential pressure itself.

Figure 19:
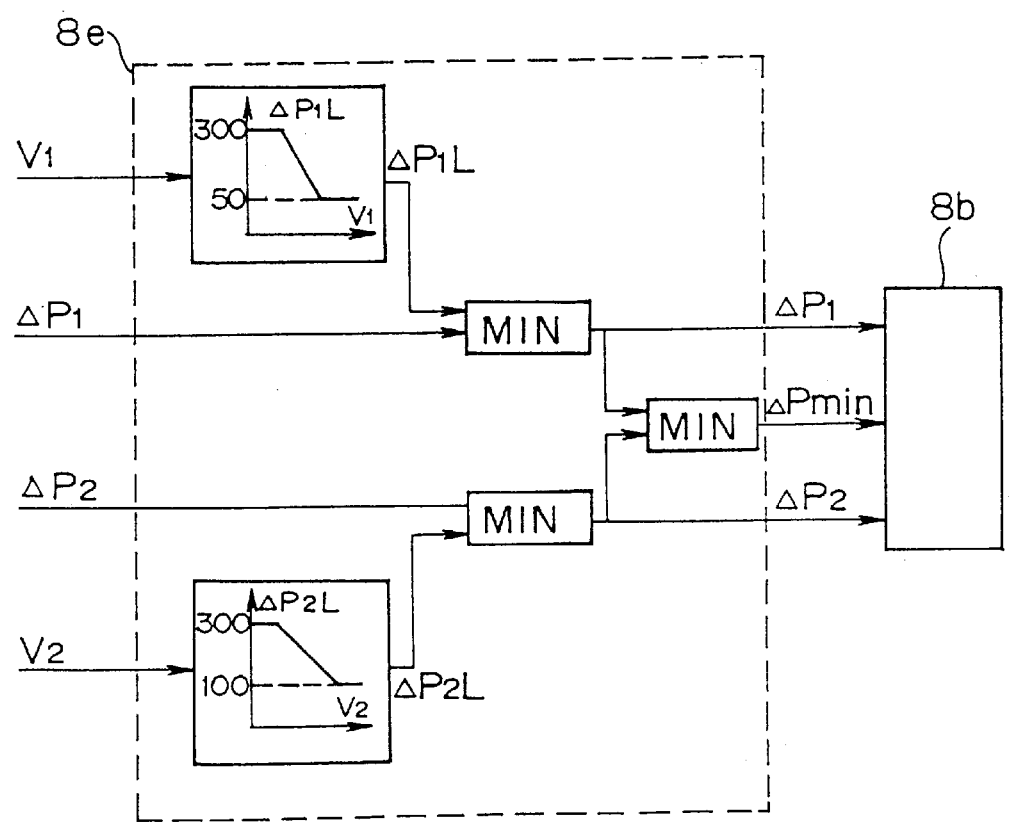
FIG. 19 is a diagram, which shows a configuration of an embodiment of a control device for a hydraulic drive machine related to the present invention, and which shows the configuration when the degree of pressure compensation is varied.

FIG. 19 depicts an embodiment in which lever-sensitive variable pressure compensation control is applied.

As shown in this FIG. 19, differential pressure calculation means 8e of controller 8 is differential pressure calculation means, which include a function that limits a detected differential pressure. That is, this differential pressure calculation means 8e is provided with a limit value table, which specifies the relationship between control inputs V1, V2 and upper limit differential pressures ΔP1L, ΔP2L, whereby, as control inputs V1, V2 become larger, upper limit differential pressures ΔP1L, ΔP2L become smaller.

Accordingly, currently operating lever signals V1, V2 are inputted, and boom upper limit differential pressure ΔP1L, arm upper limit differential pressure ΔP2L corresponding thereto are outputted from the above-mentioned limit value table.

Then, the size of these boom upper limit differential pressure ΔP1L, arm upper limit differential pressure ΔP2L are each compared with the size of actual detected differential pressures ΔP1, ΔP2, and the smaller of these are selected and outputted as detected differential pressures ΔP1, ΔP2.

Further, the various minimum differential pressures ΔP1, ΔP2 thus obtained for the boom, arm are also compared as to size, and the smaller thereof is selected and outputted as the minimum differential pressure ΔPmin.

In accordance with the above-mentioned configuration, when lever control inputs V1, V2 become large, detected differential pressures ΔP1, ΔP2 are limited by upper limit differential pressures ΔP1L, ΔP2L. For this reason, the detected differential pressure for each shaft ΔP1, ΔP2, which become the denominators for correction factors K1, K2, are underestimated in correction factor calculation means 8b, and correction factors K1, K2 become even larger than at normal pressure compensation control, and pressure compensation is not fully effective. That is, the degree of pressure compensation is weakened.

As described above, even with an embodiment, which limits this detected differential pressure itself, the same lever-sensitive variable pressure compensation control can be performed similar to the embodiment, which limits the range of correction factors K1, K2.

In the variable pressure compensation control embodiment described above, a different pattern can be set in the limit value variation pattern stored in the limit value table, in accordance with the type of work (work mode) currently being performed, and the combination of working machines currently being driven. This makes it possible to handle all sorts of work, and improves flexibility.

INDUSTRIAL APPLICABILITY

The present invention can be applied to construction equipment, such as a hydraulic excavator, as well as to any other hydraulic drive machine. Further, the present invention is used primarily to control 2 working machines, such as a boom, arm, but, of course, it can also be applied to 3 or more working machines.

What is claimed is:

1. A control device for a hydraulic drive machine which comprises a hydraulic pump, a plurality of hydraulic actuators provided in correspondence with a plurality of operating members, and a plurality of operating valves for supplying to corresponding hydraulic actuators a pressure oil discharged from the hydraulic pump at a flow rate that accords with control inputs of the operating members, and which drives the hydraulic actuators in accordance with the operation of the operating members, characterized in that the control device comprises:

differential pressure detection means for detecting for each operating valve a differential pressure between a pressure of the pressure oil flowing into the operating valve and a pressure of the pressure oil flowing out of the operating valve;

minimum differential pressure selection means for selecting a minimum differential pressure from among the differential pressures detected by the differential pressure detection means;

correction factor calculation means for calculating for each operating member a correction factor for correcting, on the basis of a ratio between the detected differential pressure of the operating valve and the selected minimum differential pressure, a control input of an operating member corresponding to the operating valve; and control input correction means for correcting the control input of a corresponding operating member using the correction factor calculated by the correction factor calculation means.

2. The control device for the hydraulic drive machine according to claim 1, characterized in that the correction factor is expressed by $\sqrt{(\Delta Pmin/\Delta Pi)}$ when the minimum differential pressure is treated as $\Delta Pmin$, and the detected differential pressure of an operating valve i is treated as $\Delta Pi$.

3. The control device for the hydraulic drive machine according to claim 1, characterized in that the differential pressure detection means detects, from among restrictors of the operating valve, a differential pressure of pressures across a restrictor on a side from which the pressure oil flows into the hydraulic actuator.

4. The control device for the hydraulic drive machine according to claim 1, characterized in that the differential pressure detection means detects, from among restrictors of the operating valve, a differential pressure of pressures across a restrictor on the side to which the pressure oil flows out from the hydraulic actuator.

5. The control device for the hydraulic drive machine according to claim 1, characterized in that the operating valve supplies to the hydraulic actuator the pressure oil, a flow rate of which accords with an aperture area, the operating member outputs as a control input a size of the aperture area of the operating valve, and the control input correction means determines the corrected control input by multiplying the correction factor by the aperture area as the control input of the operating member.

6. The control device for the hydraulic drive machine according to claim 1, characterized in that the operating valve is subjected to a feedback control with the use of a drive volume of a spool, as a target value, corresponding to a corrected control input corrected by the control input correction means and an actual drive volume of the spool as a feedback volume.

* * * * *